United States Patent
Ono et al.

(10) Patent No.: US 9,374,794 B2
(45) Date of Patent: Jun. 21, 2016

(54) APPARATUS AND METHOD FOR ADJUSTING A REFERENCE TIMING

(71) Applicant: FUJITSU LIMITED, Kawasaki-shi, Kanagawa (JP)

(72) Inventors: Yoshiyuki Ono, Komae (JP); Kazuya Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/254,065

(22) Filed: Apr. 16, 2014

(65) Prior Publication Data

US 2014/0348138 A1 Nov. 27, 2014

(30) Foreign Application Priority Data

May 23, 2013 (JP) ................................. 2013-108983

(51) Int. Cl.
*H04W 56/00* (2009.01)

(52) U.S. Cl.
CPC .................................. *H04W 56/001* (2013.01)

(58) Field of Classification Search
CPC .................................................. H04W 56/001
See application file for complete search history.

(56) References Cited

U.S. PATENT DOCUMENTS

| 2010/0054237 A1* | 3/2010 | Han | H04J 3/0638 370/350 |
| 2014/0148187 A1* | 5/2014 | Hong | H04W 56/0005 455/452.1 |

FOREIGN PATENT DOCUMENTS

| EP | 1041746 A1 | 10/2000 | |
| GB | 2489743 | * 10/2012 | ............ H04W 56/00 |
| JP | 2000-315978 A | 11/2000 | |

* cited by examiner

*Primary Examiner* — Jae Y Lee
(74) *Attorney, Agent, or Firm* — Myers Wolin, LLC

(57) ABSTRACT

In a communication system including first and second base stations, an apparatus operates as the first base station. The apparatus determines a first reference timing that is used as a reference timing for transmitting a downlink signal, and adjusts the determined first reference timing to a second reference timing being used in the second base station. The apparatus corrects a deviation of the first reference timing from the second reference timing, which has occurred after adjustment of the first reference timing, in accordance with a receiving timing of a preamble signal transmitted from a mobile station device to the second base station.

13 Claims, 16 Drawing Sheets

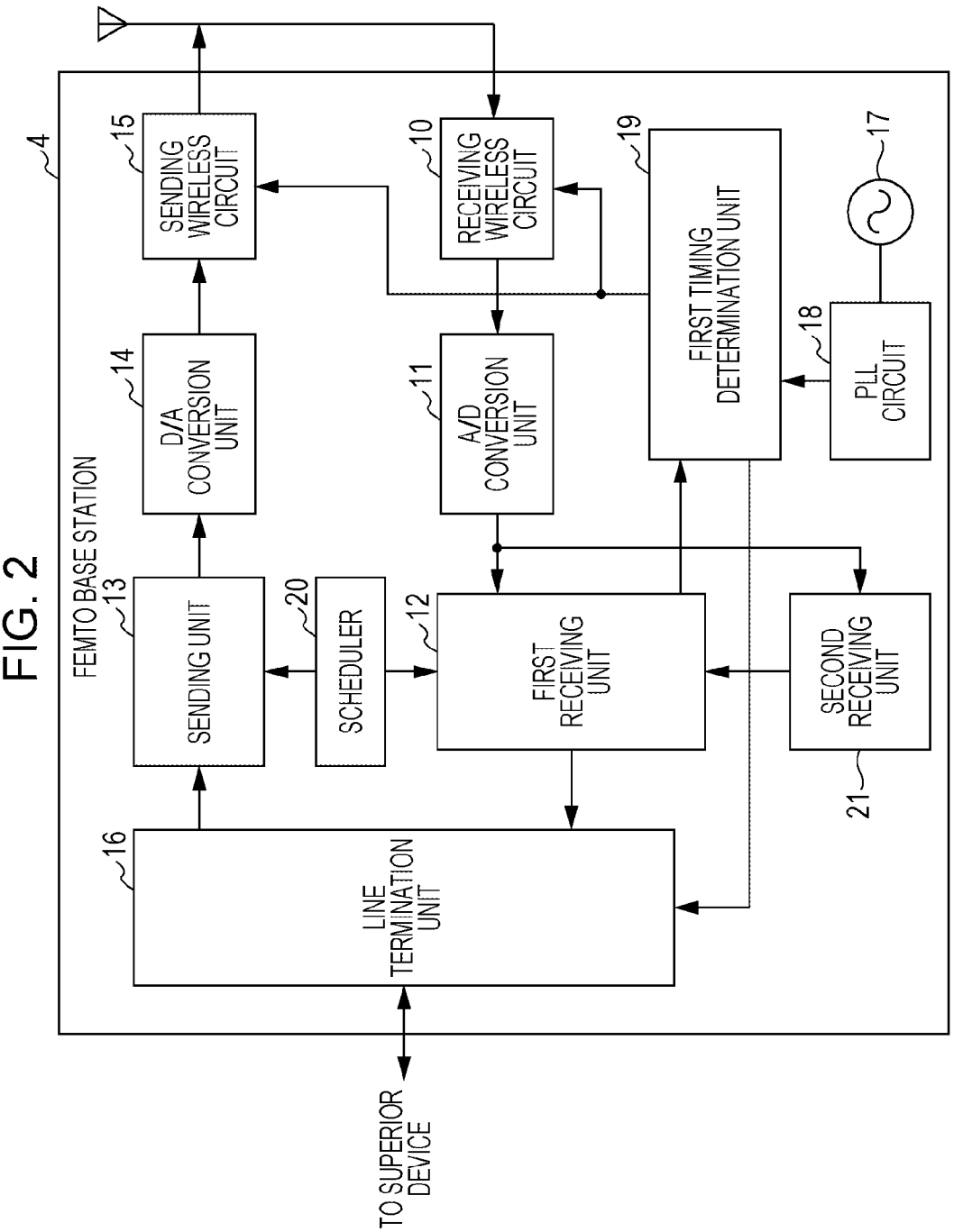

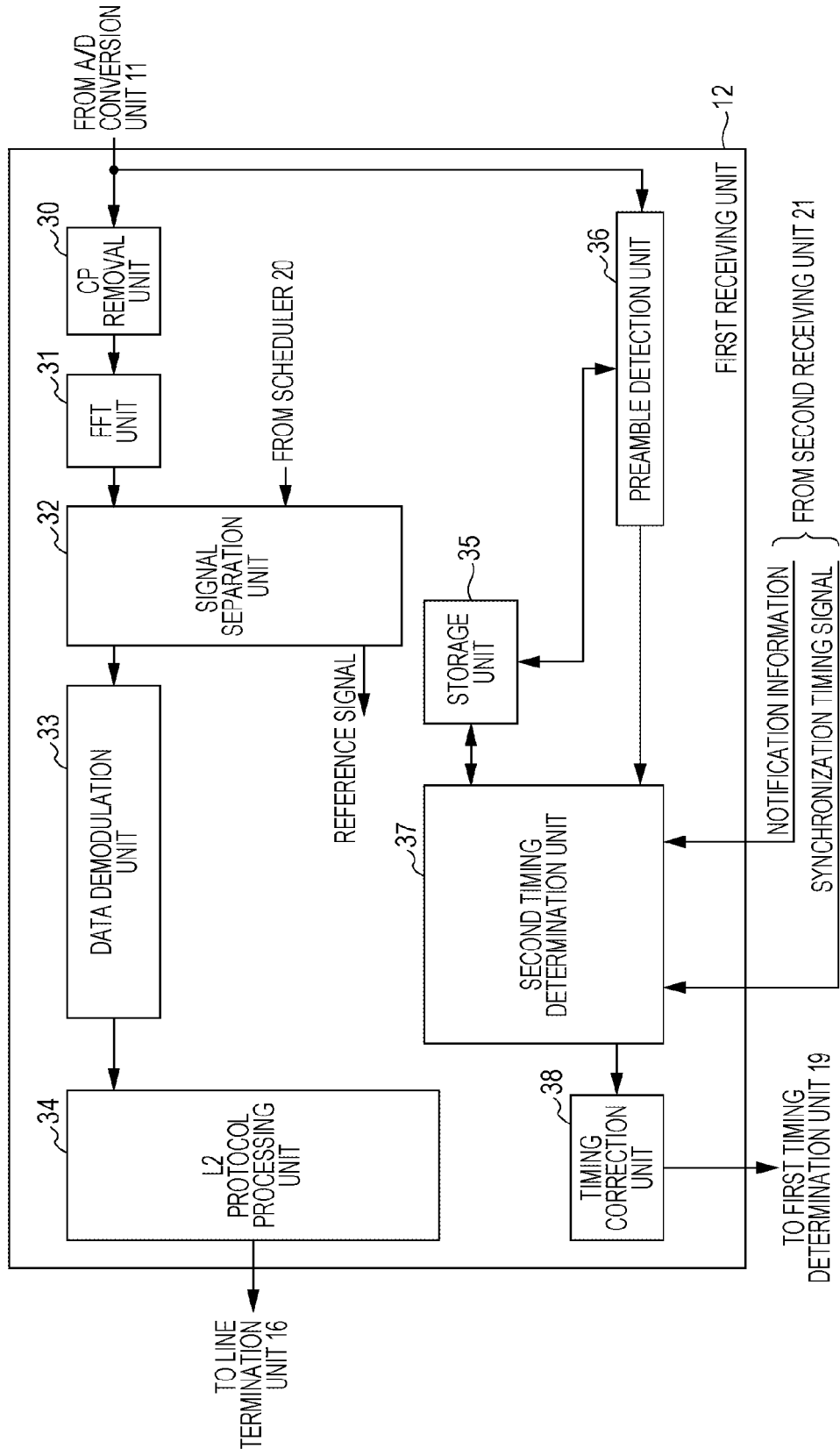

APPARATUS AND METHOD FOR ADJUSTING A REFERENCE TIMING

CROSS-REFERENCE TO RELATED APPLICATION

This application is based upon and claims the benefit of priority of the prior Japanese Patent Application No. 2013-108983, filed on May 23, 2013, the entire contents of which are incorporated herein by reference.

FIELD

The embodiments discussed herein are related to an apparatus and method for adjusting a reference timing.

BACKGROUND

When cells formed respectively by a plurality of base station apparatuses overlap with each other, interference between downlink signals that are transmitted by these cells sometimes becomes a problem. For example, in a mobile communication system in accordance with Long Term Evolution (LTE) defined by the 3rd Generation Partnership Project (3GPP), interference to a Physical Downlink Control Channel (PDCCH) sometimes becomes a problem. This is because a mobile station device demodulates a signal received from a base station apparatus based on control information contained in the PDCCH.

It is possible to reduce the interference by differentiating, for each of the plurality of base station apparatuses, a time period in which a downlink signal from the each base station apparatus arrives at a mobile station device. As one example of such a technique, there is an inter-cell interference control technique called enhanced inter-cell interference coordination (eICIC) introduced in Long Term Evolution (LTE).

In the eICIC, a macrocell schedules a subframe that does not contain data called an almost blank subframe (ABS). A picocell or a femtocell transmits a downlink signal in a time slot in which an ABS is scheduled.

As a related technique, there is a method of synchronizing base stations in a wireless communication system where adjacent base stations perform transmission at the same frequency. The step of synchronizing a first base station with a second base station is carried out through a mobile station. The synchronization includes a step of causing the mobile station to listen to synchronization signals from both the base stations and to measure a difference between results of receiving the synchronization signals from both the base stations, a step of causing the mobile station to synchronize with the first base station and to transmit data from the mobile station so that the data is received by the first base station with a given offset, and a step of causing the second base station to measure the offset of the data received from the mobile station (for example, refer to Japanese Laid-open Patent Publication No. 2000-315978).

SUMMARY

According to an aspect of the invention, in a communication system including first and second base stations, the apparatus operates as the first base station. The apparatus determines a first reference timing that is used as a reference timing for transmitting a downlink signal, and adjusts the determined first reference timing to a second reference timing being used in the second base station. The apparatus corrects a deviation of the first reference timing from the second reference timing, which has occurred after adjustment of the first reference timing, in accordance with a receiving timing of a preamble signal transmitted from a mobile station device to the second base station apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a functional configuration of a femto base station, according to an embodiment;

FIG. 3 is a diagram illustrating an example of a functional configuration of a first receiving unit, according to an embodiment;

DESCRIPTION OF EMBODIMENTS

Timing to transmit a downlink signal by the base station apparatus is defined with reference to predetermined periodic reference timing. The reference timing is, for example, start timing of a wireless frame and a subframe thereof. Even when a plurality of base station apparatuses transmit downlink signals in different subframes, if the reference timing of individual base station apparatuses is defined independently, there may be a risk of causing interference due to overlap of time periods in which the downlink signals arrive at the mobile station device.

1. Configuration Diagram of Communication System

Figure 1:
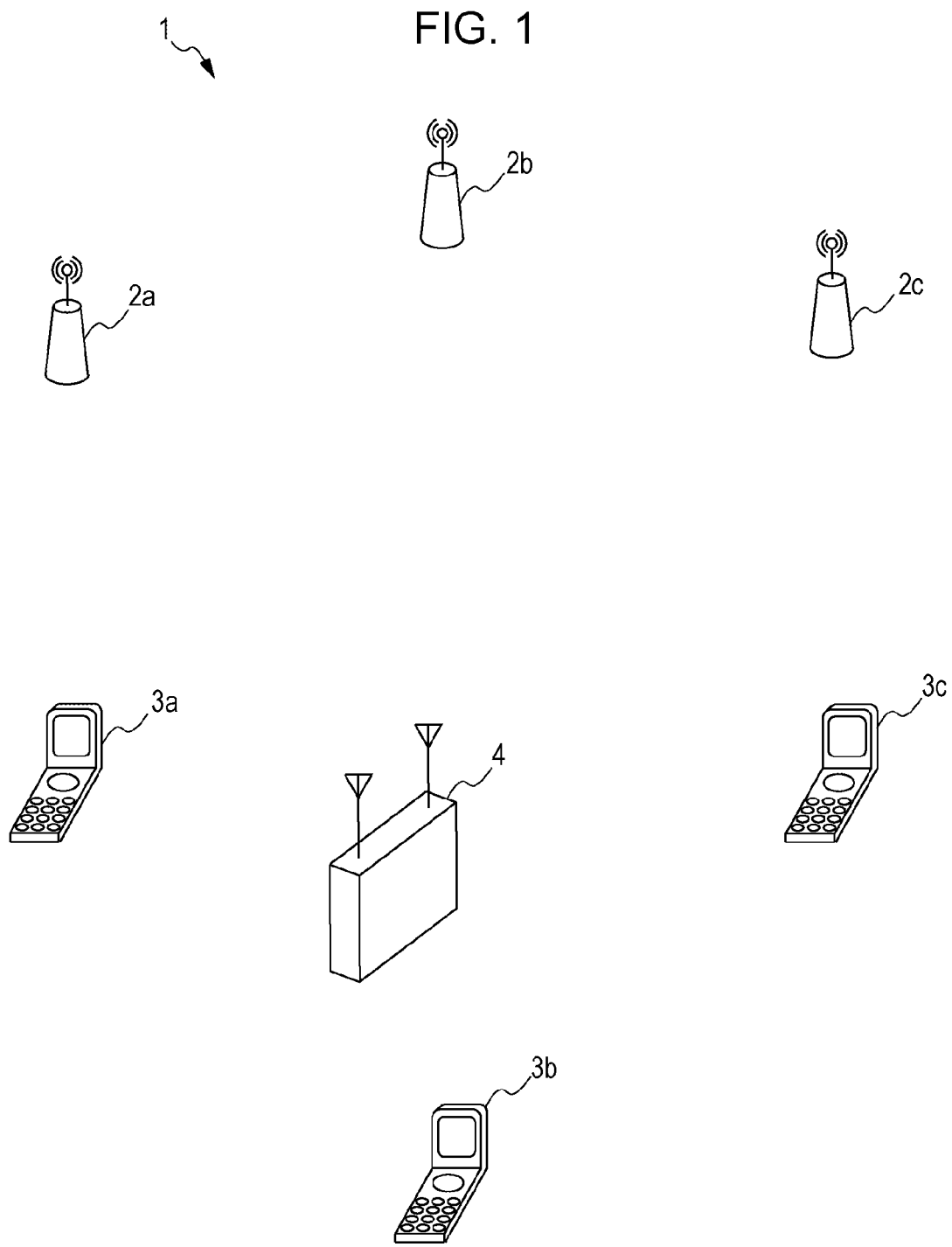
FIG. 1 is a diagram illustrating an example of a communication system, according to an embodiment.

Descriptions are given below of preferred embodiments with reference to the attached drawings. FIG. 1 illustrates a configuration example of a communication system. A communication system 1 is provided with base station apparatuses 2a through 2c and 4 and mobile station devices 3a through 3c. In the following descriptions, the base station apparatuses and the mobile station devices will be also expressed as "base stations" and "mobile stations", respectively. The base stations 2a through 2c will also be expressed collectively as a base station 2. The mobile stations 3a through 3c will also be expressed collectively as a mobile station 3.

The base station 2 forms a cell, which is a wireless communication area to allow wireless communication with the mobile station 3, to communicate with the mobile station 3 in the cell in accordance with predetermined wireless communication standards. An example of the wireless communication standards may be 3rd generation (3G) wireless communication standards, LTE, and the like defined by the 3GPP.

The base station 4 communicates with the mobile station 3 in accordance with the same standards as the wireless communication standards that the base station 2 complies with. A cell formed by the base station 4 may be, for example, a cell relatively smaller than the cell formed by the base station 2. The base station 2 may be, for example, a macro base station that forms a cell with a radius of approximately several kilometers. The base station 4 may be, for example, a femto base station or a pico base station that forms a small scale cell with a radius of approximately several tens of meters.

The following descriptions employ an exemplification where the base station 4 is a femto base station. A wireless communication area generated by the femto base station 4 will be also expressed as "a femtocell". It is to be noted that this exemplification is not intended to limit the application of the base stations described herein only to femto base stations. The base stations described herein are widely applicable to base stations that carry out communication at timing synchronized with another base station.

In the following descriptions, it is assumed that a cell formed by the femto base station 4 overlaps with cells formed respectively by the base stations 2a through 2c.

FIG. 2 is a diagram illustrating an example of a functional configuration of a femto base station, according to an embodiment. The femto base station 4 is configured to include a receiving wireless circuit 10, an analog digital conversion unit 11, a first receiving unit 12, a sending unit 13, a digital analog conversion unit 14, and a sending wireless circuit 15. The femto base station 4 is further includes a line termination unit 16, an oscillator 17, a phase synchronization circuit 18, a first timing determination unit 19, a scheduler 20, and a second receiving unit 21. In the attached drawings, the analog digital conversion unit and the digital analog conversion unit are expressed as "an A/D conversion unit" and "a D/A conversion unit", respectively.

The receiving wireless circuit 10 processes a wireless frequency signal of an uplink signal from the mobile station 3 to convert the uplink signal to an analog baseband signal. The analog digital conversion unit 11 converts the uplink signal to a digital signal. The first receiving unit 12 carries out a process of the baseband signal of the uplink signal.

The sending unit 13 carries out a process of a baseband signal of a downlink signal transmitted from the femto base station 4 to the mobile station 3. The digital analog conversion unit 14 converts the downlink signal to an analog baseband signal. The sending wireless circuit 15 converts the downlink signal to a wireless frequency signal followed by amplification for transmitting.

The line termination unit 16 terminates a wireless access line with the mobile station 3 and a network line with a superior device to relay data communication between the mobile station 3 and the superior device.

The phase synchronization circuit 18 generates an operating clock signal of the femto base station 4, based on a periodic signal generated by the oscillator 17. The first timing determination unit 19 determines reference timing used as reference for start timing of a periodic behavior of the femto base station 4, based on the operating clock signal generated by the phase synchronization circuit 18. The first timing determination unit 19 outputs a reference timing signal indicating the reference timing, to the receiving wireless circuit 10, the sending wireless circuit 15, and the line termination unit 16.

The periodic behavior may be, for example, transmitting of a downlink signal and receiving of an uplink signal. The reference timing may be, for example, timing used as reference for start timing of a wireless frame of a downlink signal or an uplink signal and a subframe thereof, or the start timing itself of a wireless frame and a subframe thereof.

In the following descriptions, an exemplification where the reference timing is start timing of a subframe is employed. It is to be noted that this exemplification is not intended to limit the interpretation of the reference timing described herein only as the start timing of a subframe. The reference timing described herein may also be any timing as long as the timing is periodic timing used as reference for a moment to transmit a downlink signal by a base station.

The receiving wireless circuit 10 detects an uplink signal at a receiving moment specified using start timing of a subframe indicated by a reference timing signal as reference. Similarly, the sending wireless circuit 15 transmits a downlink signal at a transmitting moment specified using start timing of a subframe as reference. The line termination unit 16 determines data receiving timing from the first receiving unit 12 and data sending timing to the sending unit 13, based on the start timing of a subframe.

The second receiving unit 21 carries out cell search for a cell of another base station 2 to obtain notification information transmitted from the base station 2. The second receiving unit 21 may carry out cell search for a cell of the base station 2 and obtain notification information by sniffering, for example, a synchronization signal and notification information that are transmitted from the sniffering base station 2 to the mobile station 3.

The second receiving unit 21 obtains receiving timing of beginning of a subframe transmitted from the base station 2 by performing cell search for a cell of another base station 2. The second receiving unit 21 outputs a synchronization timing signal indicating the receiving timing to the first receiving unit 12. The second receiving unit 21 obtains a sequence number of a preamble sequence unique to another base station 2, from the notification information. The second receiving unit 21 outputs the sequence number of the preamble sequence to the first receiving unit 12.

The first receiving unit 12 adjusts the reference timing determined by the first timing determination unit 19, based on the synchronization timing signal. For example, the first receiving unit 12 may adjust the reference timing so as to synchronize the receiving timing of the beginning of the subframe transmitted from the base station 2 with the reference timing.

The first receiving unit 12 detects a preamble that the mobile station 3 transmits to another base station 2 in random access, based on the sequence number of the preamble sequence obtained by the second receiving unit 21. The preamble subject to detection may be a preamble that is transmitted at any time of initial attachment, handover, resynchronization, and reconnection.

The reference timing sometimes deviates from the timing adjusted based on the synchronization timing signal. For example, when the precision of the oscillator 17 is not sufficiently high, the reference timing does not maintain the desired precision. In response to reception of the preamble for another base station 2, the first receiving unit 12 corrects the deviation of the reference timing that has occurred after adjustment of the reference timing based on the synchronization timing signal.

In order to suppress interference from another base station 2 in a downlink, the scheduler 20 schedules a downlink signal on a time resource on which the base station 2 does not schedule a downlink signal. For example, the scheduler 20 schedules a downlink signal in a subframe in which the base station 2 does not schedule a downlink signal. Since the subframe transmitted by the femto base station 4 is synchronized with the subframe received from the base station 2, time periods during which the femtocell receives the downlink signals of these base stations do not overlap, thereby avoiding the interference between these signals.

2. First Embodiment

FIG. 3 is a diagram illustrating an example of a functional configuration of a first receiving unit, according to an embodiment. The first receiving unit 12 is configured to include a cyclic prefix removal unit 30, a fast Fourier transform unit 31, a signal separation unit 32, a data demodulation unit 33, and an L2 protocol processing unit 34. The first receiving unit 12 also includes a storage unit 35, a preamble detection unit 36, a second timing determination unit 37, and a timing correction unit 38. In the attached drawings, a cyclic prefix and fast Fourier transform will be also expressed as "a CP" and "FFT", respectively.

The cyclic prefix removal unit 30 removes a cyclic prefix inserted into an uplink signal. The fast Fourier transform unit 31 detects a signal of each subcarrier contained in the uplink signal from which the cyclic prefix has been removed. The signal separation unit 32 separates a reference signal and data from the signal of each subcarrier and outputs the data to the data demodulation unit 33.

The data demodulation unit 33 carries out demodulation of the data contained in the uplink signal and outputs the demodulated data to the L2 protocol processing unit 34. The L2 protocol processing unit 34 carries out a data receiving process in accordance with a layer 2 protocol and outputs the received data to the line termination unit 16.

The second timing determination unit 37 receives, from the second receiving unit 21, the sequence number of the preamble sequence that is unique to the base station 2a and extracted from the notification information, and the synchronization timing signal. The second timing determination unit 37 stores the sequence number of the preamble sequence in the storage unit 35.

The second timing determination unit 37 determines the reference timing based on the synchronization timing signal. For example, the second timing determination unit 37 may determine the reference timing so that the timing indicated by the synchronization timing signal is synchronized with the reference timing. The timing correction unit 38 adjusts the reference timing determined by the first timing determination unit 19 so as to be the same timing as the reference timing determined by the second timing determination unit 37.

The preamble detection unit 36 detects a preamble that has been transmitted from the mobile station 3a to another base station 2a, based on the sequence number of the preamble sequence stored in the storage unit 35. For example, the preamble detection unit 36 may detect a preamble for the base station 2a by generating a preamble based on the sequence number of the preamble sequence stored in the storage unit 35 and calculating correlation between the preamble thus generated and the received preamble.

When determining the reference timing based on the synchronization timing signal, the second timing determination unit 37 determines a timing difference Δ between the reference timing adjusted based on the synchronization timing signal and the detection timing of a preamble for the base station 2a.

Figure 4A:
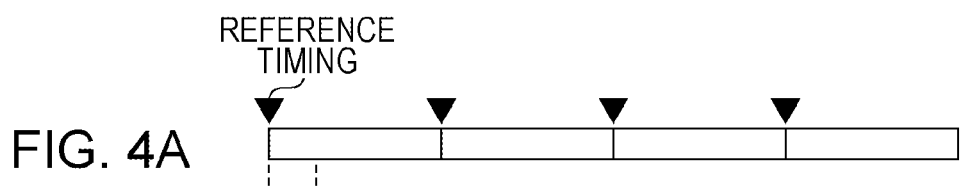
FIGS. 4A to 4D are diagrams illustrating examples of a method of correcting reference timing, according to an embodiment.
Figure 4B:
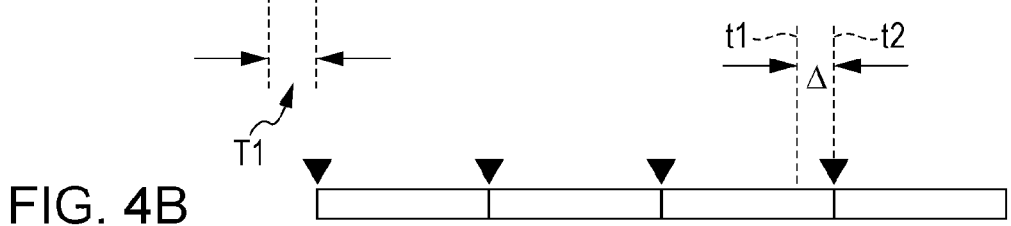

FIG. 4A is a timing diagram of the subframe transmitted from the base station 2a, and FIG. 4B is a timing diagram of the subframe transmitted from the femto base station 4 in which the reference timing is adjusted based on the synchronization timing signal. In FIGS. 4A and 4B, a solid inverted triangle denotes reference timing. This is similar in FIGS. 4C and 4D described later.

In a state in which the reference timing is adjusted based on the synchronization timing signal, due to a propagation delay of a synchronization signal between the base station 2a and the femto base station 4, the subframe of the femto base station 4 is delayed by a time period T1 from the subframe of the base station 2a.

When the preamble detection unit 36 detects the preamble transmitted from the mobile station 3a to another base station 2a at a clock time t1, the second timing determination unit 37 determines a timing difference Δ between the reference timing and the detection timing of the preamble for the base station 2a. For example, the second timing determination unit 37 determines a time difference between reference timing t2 that comes firstly after the clock time t1 and the clock time t1 (time difference of t2−t1) as the timing difference Δ. The second timing determination unit 37 stores the timing difference Δ in the storage unit 35.

Figure 4C:
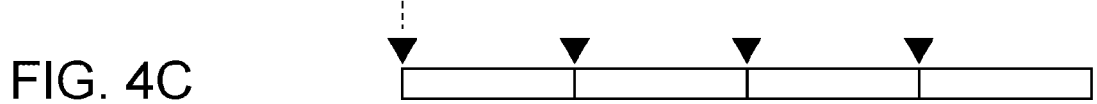

FIG. 4C is a timing diagram of the subframe in a state in which the reference timing of the femto base station 4 is deviated from the timing adjusted based on the synchronization timing signal. The subframe in the state of FIG. 4C is delayed by a time period T2 from the subframe adjusted based on the synchronization timing signal. For example, FIG. 4C is a subframe of the femto base station 4 after the lapse of a long period of time after the adjustment based on the synchronization timing signal.

When the preamble detection unit 36 detects the preamble transmitted to another base station 2a at a clock time t3, the second timing determination unit 37 determines the reference timing based on the timing difference Δ stored in the storage unit 35 and the preamble detection timing. For example, the second timing determination unit 37 determines a clock time t4 delayed by the timing difference Δ from the clock time t3 as the reference timing.

The timing correction unit 38 corrects the reference timing determined by the first timing determination unit 19 so as to be the same timing as the reference timing determined by the second timing determination unit 37.

Since the cell radius of a femtocell is relatively small, it is expected that a difference of propagation delays, between the mobile station 3 and the base station 2*a*, at respective time points when the femto base station 4 receives the preamble in FIGS. 4B and 4C is relatively small. That is, it is expected that variation in the difference between the reference timing of the subframe of the base station 2*a* and the timing to send the preamble is relatively small. Therefore, it is expected that variation in the timing difference Δ between the reference timing of the femto base station 4 in a state of being adjusted based on the synchronization timing signal and the preamble detection timing is also relatively small.

The preamble detection unit 36 stores, in the storage unit 35, the timing difference Δ between the reference timing in a state of being adjusted based on the synchronization timing signal and the preamble detection timing. The second timing determination unit 37 and the timing correction unit 38 are capable of making the reference timing closer to the state of being adjusted by the synchronization timing signal by correcting the reference timing to timing that is deviated by the timing difference Δ from the preamble detection timing after that.

Figure 4D:
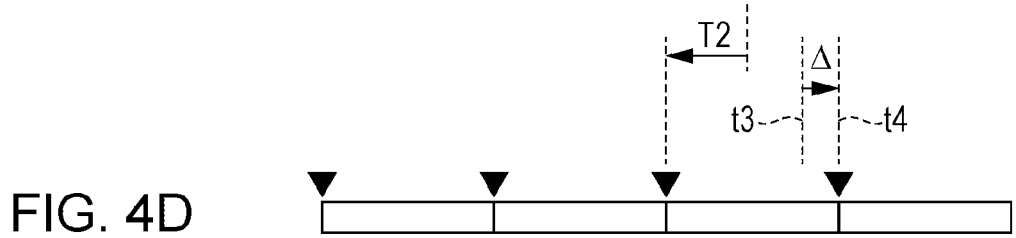

FIG. 4D is a timing diagram of a subframe of the femto base station 4 after correction. As a result of the fact that the reference timing is corrected to the clock time t4 that is delayed by the timing difference Δ from the clock time t3, the reference timing is advanced by the time period T2, and the subframe returns to the state of being adjusted based on the synchronization timing signal as in FIG. 4B.

Figure 5:
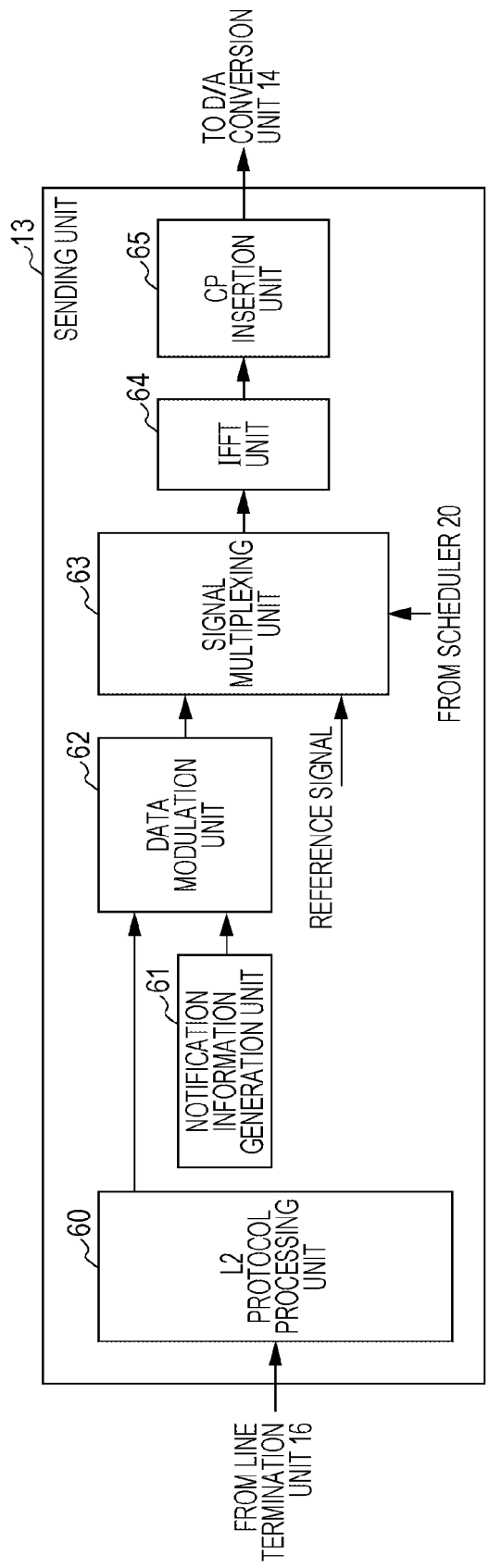
FIG. 5 is a diagram illustrating an example of a functional configuration of a sending unit, according to an embodiment.

FIG. 5 is a diagram illustrating an example of a functional configuration of a sending unit, according to an embodiment. The sending unit 13 is configured to include an L2 protocol processing unit 60, a notification information generation unit 61, a data modulation unit 62, a signal multiplexing unit 63, an inverse fast Fourier transform unit 64, and a cyclic prefix insertion unit 66. In the attached drawings, inverse fast Fourier transform will be also expressed as "IFFT".

The L2 protocol processing unit 60 receives, from the line termination unit 16, sending data that is to be transmitted via a downlink. The L2 protocol processing unit 60 carries out a data sending process on the sending data in accordance with the layer 2 protocol and outputs the sending data to the data modulation unit 62. The notification information generation unit 61 generates notification information to be given in the femtocell and outputs the notification information to the data modulation unit 62.

The data modulation unit 62 generates a modulated sending signal by modulating the sending data outputted from the L2 protocol processing unit 60 and the notification information outputted from the notification information generation unit 61, and outputs the modulated sending signal to the signal multiplexing unit 63. The signal multiplexing unit 63 multiplexes the reference signal to the modulated sending signal, and outputs the multiplexed signal to the inverse fast Fourier transform unit 64.

The inverse fast Fourier transform unit 64 transforms a subcarrier in which the sending signal and the reference signal are mapped to a time domain signal. The cyclic prefix insertion unit 66 inserts a cyclic prefix into the time domain signal and outputs the time domain signal to the digital analog conversion unit 14.

Figure 6:
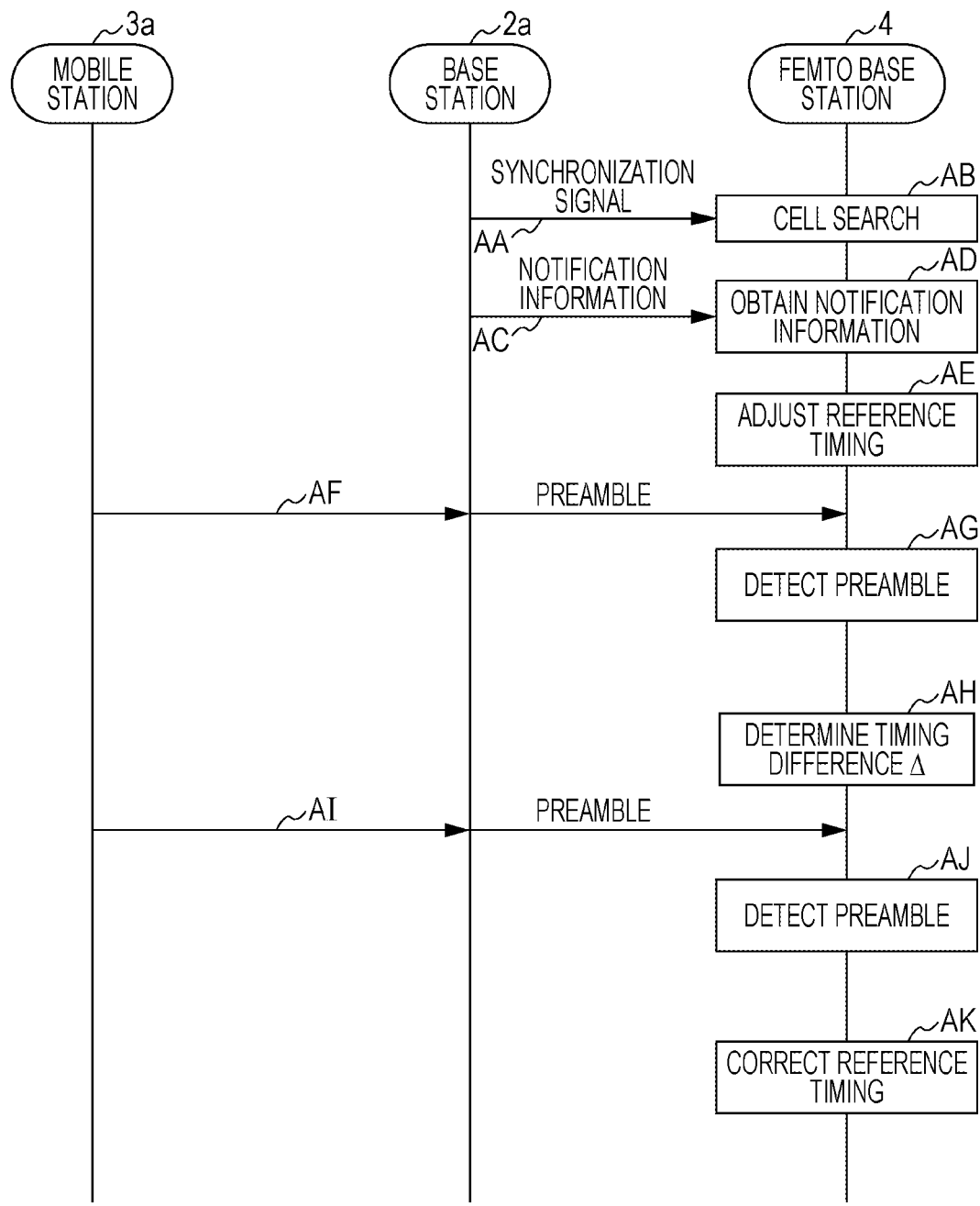
FIG. 6 is a diagram illustrating an example of an operational sequence of a femto base station, according to an embodiment.

FIG. 6 is a diagram illustrating an example of an operational sequence of a femto base station, according to an embodiment. In operation AA, the femto base station 4 receives a synchronization signal transmitted from the base station 2*a*. In operation AB, the femto base station 4 carries out cell search for a cell of the base station 2*a* based on the synchronization signal. The femto base station 4 obtains, by the cell search, receiving timing of beginning of a subframe that is transmitted from the base station 2 to generate a synchronization timing signal that indicates receiving timing.

In operation AC, the femto base station 4 receives notification information transmitted from the base station 2*a*. In operation AD, the femto base station 4 obtains the notification information. The femto base station 4 obtains a sequence number of a preamble sequence unique to the base station 2*a* from the notification information. The operations AA through AD are equivalent to the operations of the second receiving unit 21.

In operation AE, the femto base station 4 adjusts reference timing based on the synchronization timing signal. The behaviors in operation AE are equivalent to the behaviors of the second timing determination unit 37 and the timing correction unit 38. In operation AF, the mobile station 3*a* transmits the preamble for the base station 2*a*. In operation AG, the femto base station 4 detects the preamble that is transmitted from the mobile station 3*a* to the base station 2*a*. The behaviors in operation AG are equivalent to the behaviors of the preamble detection unit 36.

In operation AH, the femto base station 4 determines the timing difference Δ between the reference timing and the detection timing of the preamble. The behaviors in operation AH are equivalent to the behaviors of the second timing determination unit 37.

In operation AI after the lapse of a certain period of time, the mobile station 3*a* transmits the preamble for the base station 2*a*. In operation AJ, the femto base station 4 detects the preamble transmitted from the mobile station 3*a* to the base station 2*a*. The behaviors in operation AJ are equivalent to the behaviors of the preamble detection unit 36.

In operation AK, the femto base station 4 corrects the reference timing based on the preamble detection timing in operation AJ and the timing difference Δ. The behaviors in operation AK are equivalent to the behaviors of the second timing determination unit 37 and the timing correction unit 38.

According to the embodiment, it is possible to adjust the reference timing used for the reference for timing of transmitting a downlink signal in the femto base station 4, in relation to the reference timing used in another base station 2*a*. Therefore, it becomes possible to keep the time periods in which the signals that are transmitted from the femto base station 4 and another base station 2*a* on different time resources arrive at the mobile station, from overlapping, and to avoid interference between these signals.

According to the embodiment, after adjusting the reference timing based on the cell search result of the cell of another base station 2*a*, the reference timing is corrected based on the detection timing of the preamble that the mobile station 3*a* has transmitted to another base station 2*a*. This allows adjustment of the reference timing at a frequency higher than the frequency of executing the cell search, and it is possible to maintain the precision of the reference timing even when the frequency of executing the cell search is reduced. It is possible to reduce the time period in which the mobile station 3 is not capable of connecting to the femto base station 4 while the femto base station 4 is executing the cell search, and to enhance the availability of the femto base station 4.

Instead of or in addition to the cell search for the cell of the base station 2*a*, the reference timing of the femto base station 4 may also be adjusted using a predetermined clock time synchronization protocol. The clock time synchronization protocol may be, for example, Precision Time Protocol (PTP) defined by the Institute of Electrical and Electronic Engineers (IEEE) 1588 standard or other protocols. The second through fifth embodiments described below may also be modified similarly.

The second timing determination unit 37 exchanges a packet in which clock time information is stored, with the base station 2a, in accordance with the clock time synchronization protocol, thereby obtaining information of timing to synchronize with the reference timing of the base station 2a. The second timing determination unit 37 determines the reference timing of the femto base station 4 in accordance with the timing information thus obtained. The timing correction unit 38 adjusts the reference timing to be determined by the first timing determination unit 19 so as to be the same timing as the reference timing determined by the second timing determination unit 37.

According to this modification, after adjusting the reference timing in accordance with the clock time synchronization protocol, the reference timing is corrected based on the detection timing of the preamble that is transmitted to another base station 2a. This allows adjustment of the reference timing at a frequency higher than the frequency of executing the clock time synchronization protocol, and it is possible to maintain the precision of the reference timing even when the frequency of executing the clock time synchronization protocol is reduced. Therefore, it is possible to reduce the load of the femto base station 4 and load of the network due to execution of the clock time synchronization protocol.

When preambles from the plurality of mobile stations 3 arrive, the preamble detection unit 36 may also be configured to detect a preamble transmitted from the mobile station 3 closest to the femto base station 4. When the positions of the femto base station 4 and the base station 2a are not changed, it is expected to reduce variation in the distance between the mobile station 3 as a source of transmitting the selected preamble and the base station 2a by always selecting the preamble that is transmitted from the mobile station 3 closest to the femto base station 4.

Therefore, it is expected to reduce variation in the difference between the preamble detection timing and the reference timing in a state of being adjusted based on the synchronization timing signal. Accordingly, it is expected to reduce a difference between the preamble detection timing that is adjusted based on the synchronization timing signal and the reference timing that is corrected based on the timing difference Δ.

For example, the preamble detection unit 36 may detect a preamble that arrives at timing closest to the reference timing of the femto base station 4 as the preamble that is transmitted from the mobile station 3 closest to the femto base station 4. For example, the preamble detection unit 36 may also detect a preamble having the greatest received power as the preamble that is transmitted from the mobile station 3 closest to the femto base station 4.

The preamble detection unit 36 may store the received power of the preamble used for determination of the timing difference Δ in the storage unit 35, and after that, may detect a preamble having received power closest to the received power of the preamble used for determination of the timing difference Δ. The second timing determination unit 37 and the timing correction unit 38 may correct the reference timing based on the preamble detection timing and the timing difference Δ.

When the received power of the preamble used for determination of the timing difference Δ is close to the received power of the preamble that is received after that, it is expected that the positions of the mobile stations that have transmitted these preambles are close to each other. Therefore, it is expected that the respective differences between the reference timing in a state of being adjusted based on the synchronization timing signal and the receiving timing of these preambles are small. Accordingly, it is expected to reduce the difference between the preamble detection timing that is adjusted based on the synchronization timing signal and the reference timing that is corrected based on the timing difference Δ.

3. Second Embodiment

Descriptions are given to another embodiment of the first receiving unit 12. In the descriptions of second and third embodiments, it is assumed that the femto base station 4 is capable of receiving a preamble that is transmitted from the mobile station 3a to the base station 2a, a preamble that is transmitted from the mobile station 3b to the base station 2b, and a preamble that is transmitted from the mobile station 3c to the base station 2c.

The second receiving unit 21 in FIG. 2 carries out cell search for cells formed respectively by the base stations 2a through 2c to obtain notification information transmitted from the base stations 2a through 2c. The second receiving unit 21 measures the received power from the base stations 2a through 2c. The second receiving unit 21 outputs received power information indicating the received power from the base stations 2a through 2c to the second timing determination unit 37 of the first receiving unit 12.

The second receiving unit 21 obtains receiving timing of beginning of respective subframes that are transmitted from the base stations 2a through 2c. The second receiving unit 21 outputs the synchronization timing signal indicating the receiving timing to the second timing determination unit 37 of the first receiving unit 12.

The second receiving unit 21 obtains, from the notification information, sequence numbers of preamble sequences unique to the base stations 2a through 2c and transmitting power information. The second receiving unit 21 outputs the sequence numbers of the preamble sequences and the transmitting power information to the second timing determination unit 37 of the first receiving unit 12.

Figure 7:
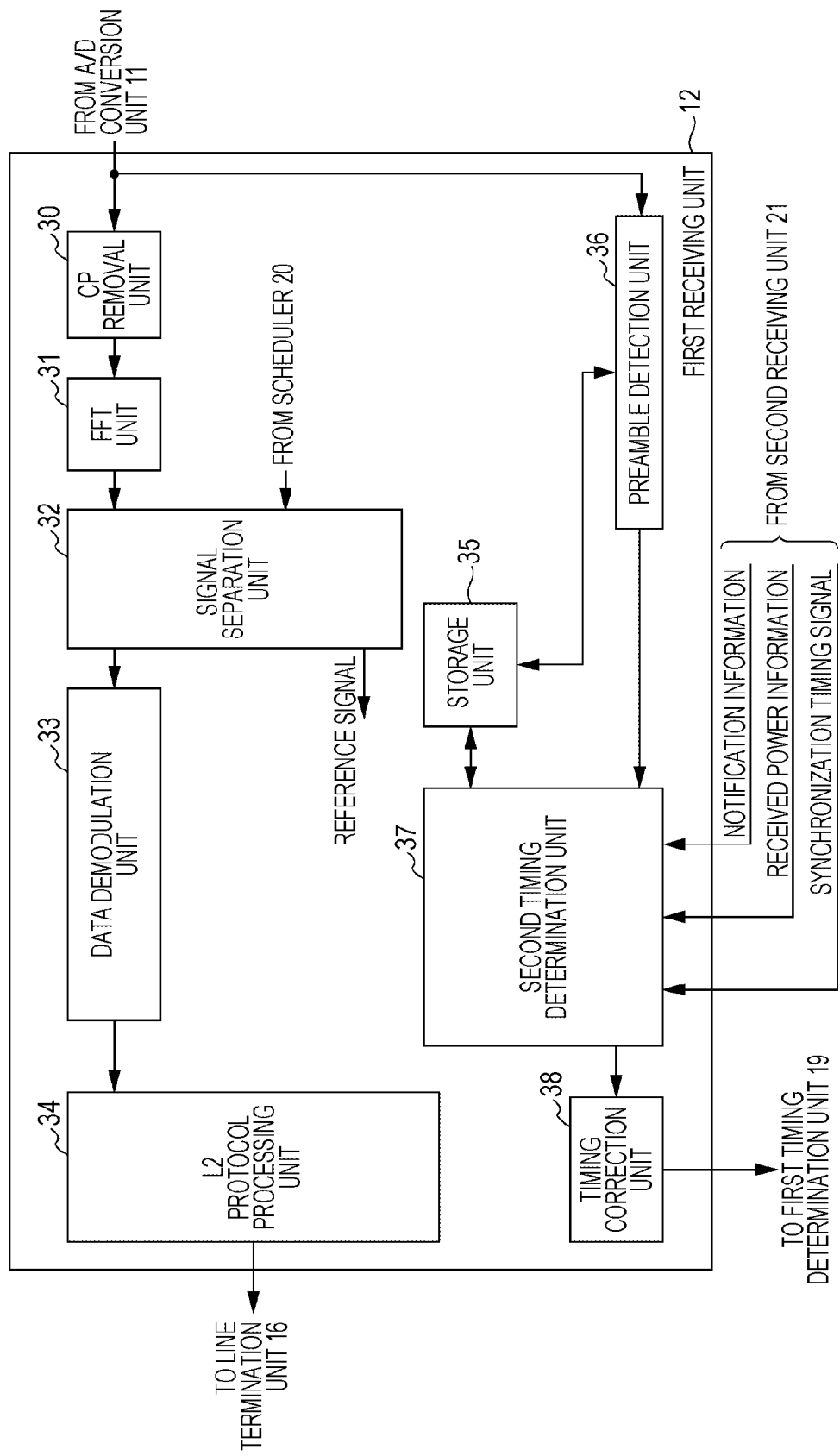
FIG. 7 is a diagram illustrating an example of a functional configuration of a first receiving unit, according to an embodiment.

FIG. 7 is a diagram illustrating an example of a functional configuration of a first receiving unit, according to an embodiment. The same reference numerals as the reference numerals used in FIG. 3 are given to components similar to the components illustrated in FIG. 3. The second timing determination unit 37 receives, from the second receiving unit 21, the sequence numbers of the preamble sequences of the base stations 2a through 2c and the transmitting power information, which are extracted from the notification information, the received power information, and the synchronization timing signal. The second timing determination unit 37 stores these pieces of information in the storage unit 35.

The second timing determination unit 37 selects a base station closest to the femto base station 4, from among the base stations 2a through 2c. For example, the femto base station 4 calculates propagation loss between the base stations 2a through 2c and the femto base station 4 in accordance with the transmitting power information and the received power information, and selects the base station having the smallest propagation loss. In the following descriptions, it is assumed that the base station 2a is a base station closest to the femto base station 4.

The second timing determination unit 37 determines the reference timing based on the synchronization timing signal generated by the cell search for a cell of the base station 2a. The timing correction unit 38 adjusts the reference timing determined by the first timing determination unit 19 so as to be the same timing as the reference timing determined by the second timing determination unit 37.

The preamble detection unit 36 measures the received power of the preambles arriving from the mobile stations 3a through 3c and detects a preamble having the greatest received power from among these preambles.

When sequence numbers of preamble sequences of the plurality of base stations 2 are stored in the storage unit 35, the preamble detection unit 36 may use the sequence numbers of the base stations in the order of the base stations having greater received power, to generate a preamble to obtain correlation with a received preamble.

The base station 2 having greater received power is expected to be closer to the femto base station 4, and the preamble that the femto base station 4 is capable of receiving has a greater possibility of being a preamble for this base station 2. By comparing the preambles, from the preamble of the sequence number of the base station 2 having greater received power first, with the received preamble, it is expected that determination of a base station for which the received preamble is destined finishes earlier and the amount of correlation computation is reduced.

The preamble detection unit 36 may also generate a preamble to obtain the correlation with the received preamble, by using the sequence numbers of the base stations in the order of the base stations having a smaller difference between the received power and the transmitting power.

The second timing determination unit 37 determines the timing difference Δ between the reference timing that is adjusted based on the synchronization timing signal and the preamble detection timing by the preamble detection unit 36 and stores the timing difference Δ in the storage unit 35.

The second timing determination unit 37 also determines the reference timing based on the preamble detection timing by the preamble detection unit 36 and the timing difference Δ. The timing correction unit 38 corrects the reference timing determined by the first timing determination unit 19 so as to be the same timing as the reference timing determined by the second timing determination unit 37.

Figure 8:
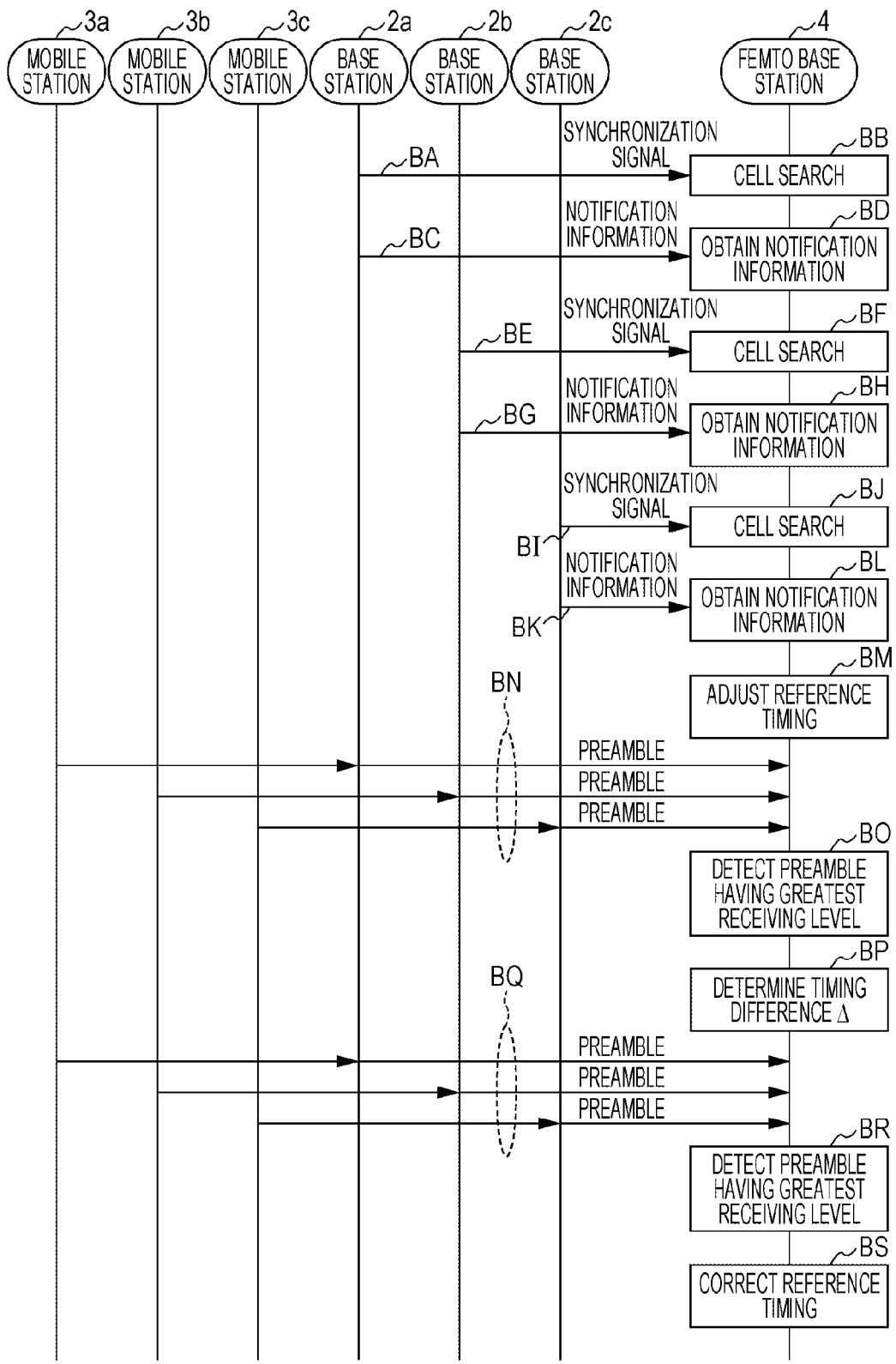
FIG. 8 is a diagram illustrating an example of an operational sequence of a femto base station, according to an embodiment.

FIG. 8 is a diagram illustrating an example of an operational sequence of a femto base station, according to an embodiment. In operation BA, the femto base station 4 receives a synchronization signal that is transmitted from the base station 2a. In operation BB, the femto base station 4 carries out cell search for a cell of the base station 2a based on the synchronization signal.

In operation BC, the femto base station 4 receives notification information that is transmitted from the base station 2a. The femto base station 4 measures the received power from the base station 2a. In operation BD, the femto base station 4 obtains the notification information. The femto base station 4 obtains a sequence number of a preamble sequence unique to the base station 2a and transmitting power information from the notification information.

In operation BE, the femto base station 4 receives a synchronization signal that is transmitted from the base station 2b. In operation BF, the femto base station 4 carries out cell search for a cell of the base station 2b based on the synchronization signal. In operation BG, the femto base station 4 receives notification information that is transmitted from the base station 2b. The femto base station 4 measures received power from the base station 2b. In operation BH, the femto base station 4 obtains the notification information. The femto base station 4 obtains a sequence number of a preamble sequence unique to the base station 2b and transmitting power information from the notification information.

In operation BI, the femto base station 4 receives a synchronization signal that is transmitted from the base station 2c. In operation BJ, the femto base station 4 carries out cell search for a cell of the base station 2c based on the synchronization signal. In operation BK, the femto base station 4 receives notification information that is transmitted from the base station 2c. The femto base station 4 measures received power from the base station 2c. In operation BL, the femto base station 4 obtains the notification information. The femto base station 4 obtains a sequence number of a preamble sequence unique to the base station 2c and transmitting power information from the notification information. The behaviors in operations BA through BL are equivalent to the behaviors of the second receiving unit 21.

In operation BM, the femto base station 4 selects a base station 2a closest to the femto base station 4 and determines the reference timing based on the synchronization timing signal generated by the cell search for a cell of the base station 2a. The femto base station 4 adjusts the reference timing based on the synchronization timing signal. The behaviors in operation BM are equivalent to the behaviors of the second timing determination unit 37 and the timing correction unit 38.

In operation BN, the mobile stations 3a through 3c transmit respective preambles for the stations 2a through 2c. In operation BO, the femto base station 4 detects a preamble having the greatest receiving level out of these preambles. The behaviors in operation BO are equivalent to the behaviors of the preamble detection unit 36.

In operation BP, the femto base station 4 determines the timing difference Δ between the reference timing and the preamble detection timing. The behaviors in operation BP are equivalent to the behaviors of the second timing determination unit 37.

In operation BQ, the mobile stations 3a through 3c transmit respective preambles for the base stations 2a through 2c. In operation BR, the femto base station 4 detects a preamble having the greatest receiving level out of these preambles. The behaviors in operation BR are equivalent to the behaviors of the preamble detection unit 36.

In operation BS, the femto base station 4 corrects the reference timing based on the preamble detection timing in operation BR and the timing difference Δ. The behaviors in operation BS are equivalent to the behaviors of the second timing determination unit 37 and the timing correction unit 38.

According to the embodiment, when interference with the plurality of base stations 2a through 2c occurs, it is possible to adjust the reference timing of the femto base station 4 in accordance with the reference timing used in the base station 2a closest to the femto base station 4. Therefore, it is possible to avoid interference with the base station 2a that is expected to cause greatest interference.

In the embodiment, when preambles from the plurality of mobile stations 3 arrive, the reference timing of the femto base station 4 is corrected based on the preamble having the greatest received power. It is expected that the preamble having the greatest received power is the preamble that is transmitted from the mobile station 3 closest to the femto base station 4.

By using the preamble that is transmitted from the mobile station 3 closest to the femto base station 4 for correction of the reference timing in all cases, it is expected to reduce variation in the difference between the preamble detection timing and the reference timing in a state of being adjusted based on the synchronization timing signal. Accordingly, it is expected to reduce the difference between the preamble detection timing that is adjusted based on the synchronization timing signal and the reference timing that is corrected based on the timing difference Δ.

The second timing determination unit 37 may also store received power of the preamble detected in operation BO in the storage unit 35. In operation BS, the preamble detection unit 36 may also detect a preamble having received power closest to the received power stored in the storage unit 35 instead of the preamble having the greatest receiving level.

Operation BM in which the reference timing is adjusted may also be executed after operation BO that detects a preamble. In operation BM, the second timing determination unit 37 may also determine the reference timing based on a synchronization timing signal generated by cell search of the base station 2 for which the preamble having the greatest received power is destined.

When the preamble has great received power, it is considered that transmitting power of a downlink signal that is transmitted from the destination base station 2 of this preamble to the source mobile station 3 is also great and the interference to the femtocell is great as well. By adjusting the reference timing of the femto base station 4 in accordance with the reference timing used in the base station 2, it is possible to avoid the interference with the base station 2 that is expected to cause great interference.

4. Third Embodiment

Descriptions are given to another embodiment of the first receiving unit 12. In the third embodiment, instead of the detection timing of the preamble having the greatest received power, the reference timing is corrected based on an average of detection timing of respective preambles that arrive from the mobile stations 3a through 3c.

The preamble detection unit 36 detects respective preambles that arrive from the mobile stations 3a through 3c. The second timing determination unit 37 determines a timing difference Δ between an average of the preamble detection timing and the reference timing that is adjusted based on the synchronization timing signal, and stores the timing difference Δ in the storage unit 35.

The second timing determination unit 37 also determines the reference timing based on the average of the detection timing of the respective preambles that arrive from the mobile stations 3a through 3c and the timing difference Δ. The timing correction unit 38 corrects the reference timing that is determined by the first timing determination unit 19 so as to be the same timing as the reference timing that is determined by the second timing determination unit 37.

The preamble detection unit 36 may also detect a predetermined number of preambles that are selected in the order of greater received power from among the respective preambles that arrive from the plurality of mobile stations 3. The second timing determination unit 37 and the timing correction unit 38 may also correct the reference timing based on an average of detection timing of preambles detected by the preamble detection unit 36.

Figure 9:
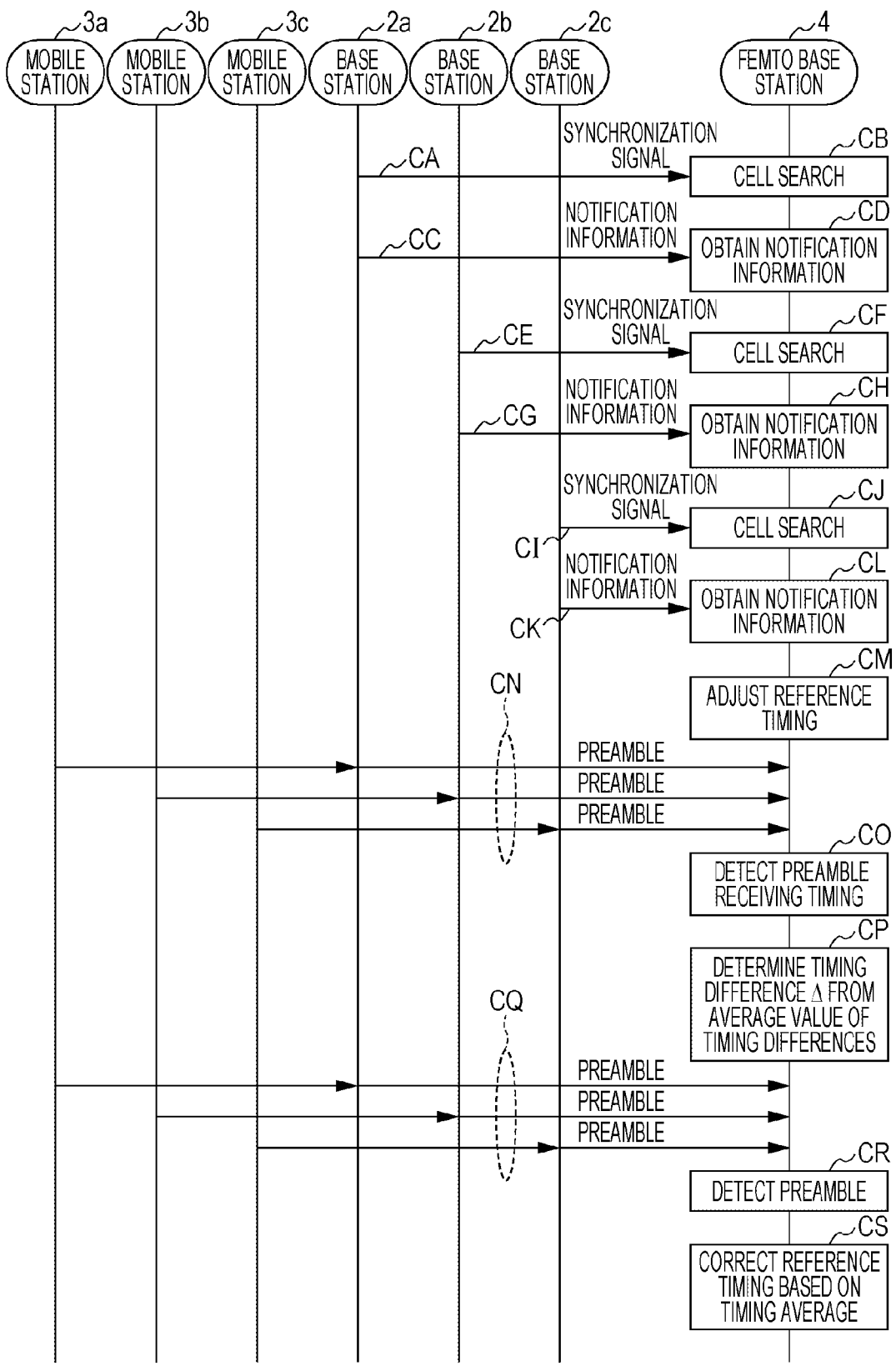
FIG. 9 is a diagram illustrating an example of an operational sequence of a femto base station, according to an embodiment.

FIG. 9 is a diagram illustrating an example of an operational sequence of a femto base station, according to an embodiment. The behaviors in operations CA through CN are similar to the behaviors in operations BA through BN in FIG. 8.

In operation CO, the femto base station 4 detects detection timing of respective preambles that arrive from the mobile stations 3a through 3c. The behaviors in operation CO are equivalent to the behaviors of the preamble detection unit 36. In operation CP, the femto base station 4 determines a timing difference Δ between an average of the preamble detection timing and the reference timing that is adjusted based on the synchronization timing signal. The behaviors in operation CP are equivalent to the behaviors of the second timing determination unit 37.

In operation CQ, the preambles for the base stations 2a through 2c are transmitted, respectively. In operation CR, the femto base station 4 detects detection timing of respective preambles that arrive from the mobile stations 3a through 3c. The behaviors in operation CR are equivalent to the behaviors of the preamble detection unit 36.

In operation CS, the femto base station 4 corrects the reference timing based on the average of the detection timing of the respective preambles in operation CR and the timing difference Δ. The behaviors in operation CS are equivalent to the behaviors of the second timing determination unit 37 and the timing correction unit 38.

According to the embodiment, when there is variation in the subframe timing between the mobile stations 3 due to the difference in the propagation delay between the mobile stations 3a through 3c and the base stations 2a through 2c, the reference timing of the femto base station 4 is corrected in accordance with the average timing. In the case, since deviation of the reference for correction to the subframe timing of some of the mobile stations 3 is avoided, it is expected to increase the mobile stations 3 in which the interference is reduced.

5. Fourth Embodiment

Descriptions are given to another embodiment of the first receiving unit 12. The femto base station 4 in the embodiment determines whether or not receiving of preambles for another base station 2 is insufficient to correct the reference timing. When the receiving of preambles is insufficient, the femto base station 4 prompts transmission of a preamble from the mobile station 3 to another base station 2.

Figure 10:
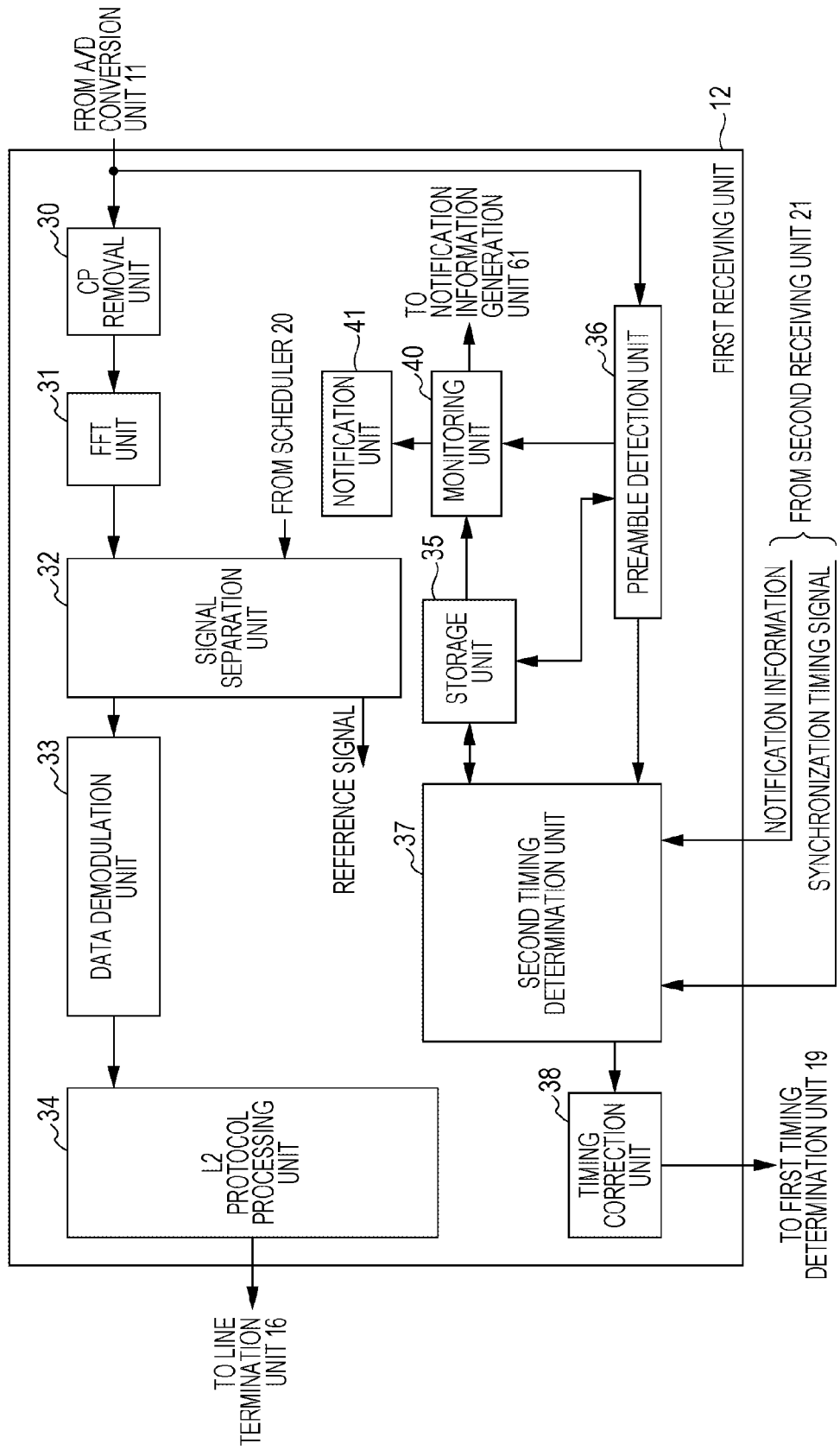
FIG. 10 is a diagram illustrating an example of a functional configuration of a first receiving unit, according to an embodiment.

FIG. 10 is a diagram illustrating an example of a functional configuration of a first receiving unit, according to an embodiment. The same reference numerals as the reference numerals used in FIG. 3 are given to components similar to the components illustrated in FIG. 3. The first receiving unit 12 includes a monitoring unit 40 and a notification unit 41.

The femto base station 4 operates in a receiving state confirmation mode to monitor whether or not the preamble transmitted from the mobile station 3 to another base station 2 is in a state of being received, or in an operation mode other than the receiving state confirmation mode.

During operation in the receiving state confirmation mode, the monitoring unit 40 determines whether or not the timing difference Δ is stored in the storage unit 35. When the timing difference Δ is not stored, the monitoring unit 40 notifies a user of the mobile station 3, via the notification unit 41, that the preamble transmitted to another base station 2 is in a state of not being received. The notification unit 41 may be configured using a lamp, a display device, a buzzer, a speaker, or the like that visually or aurally provides notification of the state in which the preamble is not received, for example. The monitoring unit 40 is capable of prompting the user to turn on the power source of the mobile station 3 by this notification.

When the timing difference Δ is stored, the monitoring unit 40 determines whether or not a state of not receiving a preamble that is transmitted from the mobile station 3 to another base station 2 is continued for a predetermined time period or more. When the state of not receiving a preamble to another base station 2 is continued for a predetermined time period or more, the monitoring unit 40 notifies the user of the mobile station 3, via the notification unit 41, that the preamble transmitted to another base station 2 is in a state of not being received.

When notifying that the preamble transmitted to another base station 2 is in a state of not being received, the monitoring unit 40 generates a preamble sending instruction signal for causing the mobile station 3 located in the area of the femtocell to transmit a preamble to another base station 2. The sending unit 13 transmits the preamble sending instruction signal generated by the monitoring unit 40 to the mobile station 3.

The preamble sending instruction signal may be notification information containing, for example, closed subscriber group identification (CSG ID) to which the mobile station 3 does not have the right of access. The monitoring unit 40 outputs the CSG ID to which the mobile station 3 does not have the right of access to the notification information generation unit 61 in FIG. 5. The sending unit 13 sends the CSG ID as the notification information. The following descriptions employ an exemplification where the preamble sending instruction signal is the notification information containing the CSG ID to which the mobile station 3 does not have the right of access. It is to be noted that this exemplification is not intended to limit the preamble sending instruction signal to the notification information containing the CSG ID to which the mobile station 3 does not have the right of access.

When receiving the CSG ID to which the mobile station 3 does not have the right of access, the mobile station 3 cancels connection to the femtocell and carries out a network selection process, a CSG selection process, and a cell selection process to determine another base station 2 to be a connection destination. After that, a preamble is transmitted from the mobile station 3 to the base station 2.

Figure 11:
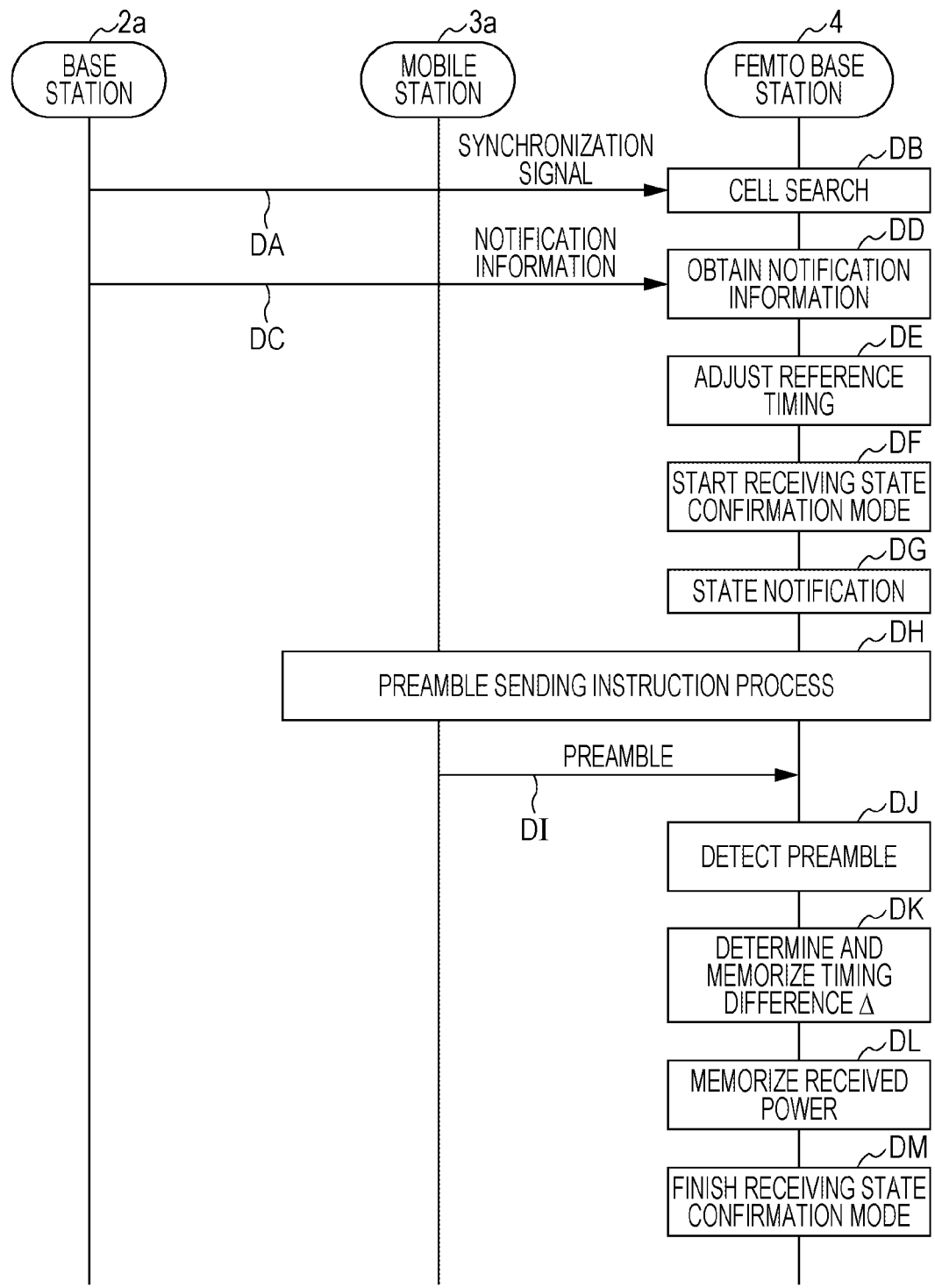
FIG. 11 is a diagram illustrating an example of an operational sequence of a femto base station, according to an embodiment.

FIG. 11 is a diagram illustrating an example of an operational sequence of a femto base station, according to an embodiment. The behaviors in operations DA through DE are similar to the operations AA through AE in FIG. 6. In operation DF, the femto base station 4 starts operation in the receiving state confirmation mode and determines whether or not the timing difference Δ is stored in the storage unit 35. The behaviors in operation DF are equivalent to the behaviors of the monitoring unit 40.

When the timing difference Δ is not stored, in operation DG, the femto base station 4 notifies the user of the mobile station 3 that the preamble transmitted to another base station 2 is in a state of not being received. The behaviors in operation DG are equivalent to the behaviors of the monitoring unit 40 and the notification unit 41.

When the timing difference Δ is not stored, in operation DH, the femto base station 4 carries out a preamble sending instruction process for causing the mobile station 3 located in the area of the femtocell to transmit a preamble to another base station 2. The behaviors in operation DH are equivalent to the behaviors of the monitoring unit 40. Details of the preamble sending instruction process are described below with reference to FIG. 12.

In operation DI, the mobile station 3a transmits a preamble for the base station 2a. In operation DJ, the femto base station 4 measures received power of the preamble transmitted from the mobile station 3a to the base station 2a, and also detects the preamble. The behaviors in operation DJ are equivalent to the behaviors of the preamble detection unit 36.

In operation DK, the femto base station 4 determines the timing difference Δ between the reference timing and the preamble detection timing. The femto base station 4 stores the timing difference Δ in the storage unit 35. The behaviors in operation DK are equivalent to the behaviors of the second timing determination unit 37.

In operation DL, the femto base station 4 memorizes the received power of the preamble measured in operation DJ. The behaviors in operation DL are equivalent to the behaviors of the second timing determination unit 37. In operation DM, the femto base station 4 finishes the operation in the receiving state confirmation mode.

Figure 12:
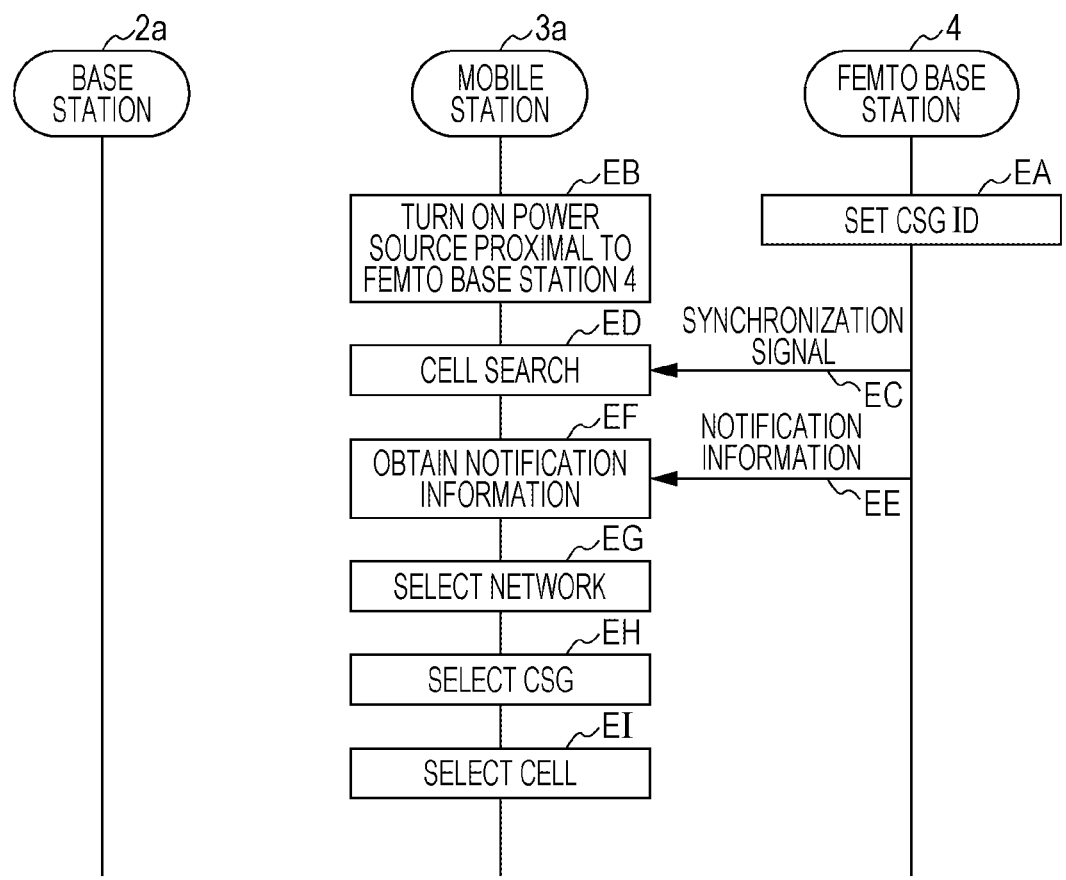
FIG. 12 is a diagram illustrating an example of an operational sequence of a preamble sending instruction process, according to an embodiment.

FIG. 12 is a diagram illustrating an example of an operational sequence of a preamble sending instruction process, according to an embodiment. In operation EA, the femto base station 4 sets the CSG ID to which the mobile station 3a does not have the right of access as an identifier to specify a CSG that is able to access the femto base station 4. The behaviors in operation EA are equivalent to the behaviors of the monitoring unit 40.

By the user that receives the notification of operation DG in FIG. 11, the power source of the mobile station 3a is turned on in close proximity to the femto base station 4 (operation EB). In operation EC, the mobile station 3a receives a synchronization signal transmitted from the femto base station 4. In operation ED, the mobile station 3a carries out cell search for a femtocell.

In operation EE, the femto base station 4 transmits notification information containing the CSG ID to which the mobile station 3a does not have the right of access. The behaviors in operation EE are equivalent to the behaviors of the sending unit 13. In operation EF, the mobile station 3a receives the notification information.

The mobile station 3a that has received the notification information cancels the connection to the femto base station 4, and executes a network selection process, a CSG selection process, and a cell selection process (operations EG through EI) to determine the base station 2a to be a connection destination. After that, the mobile station 3a transmits a preamble to the base station 2a and starts a random access process.

Figure 13:
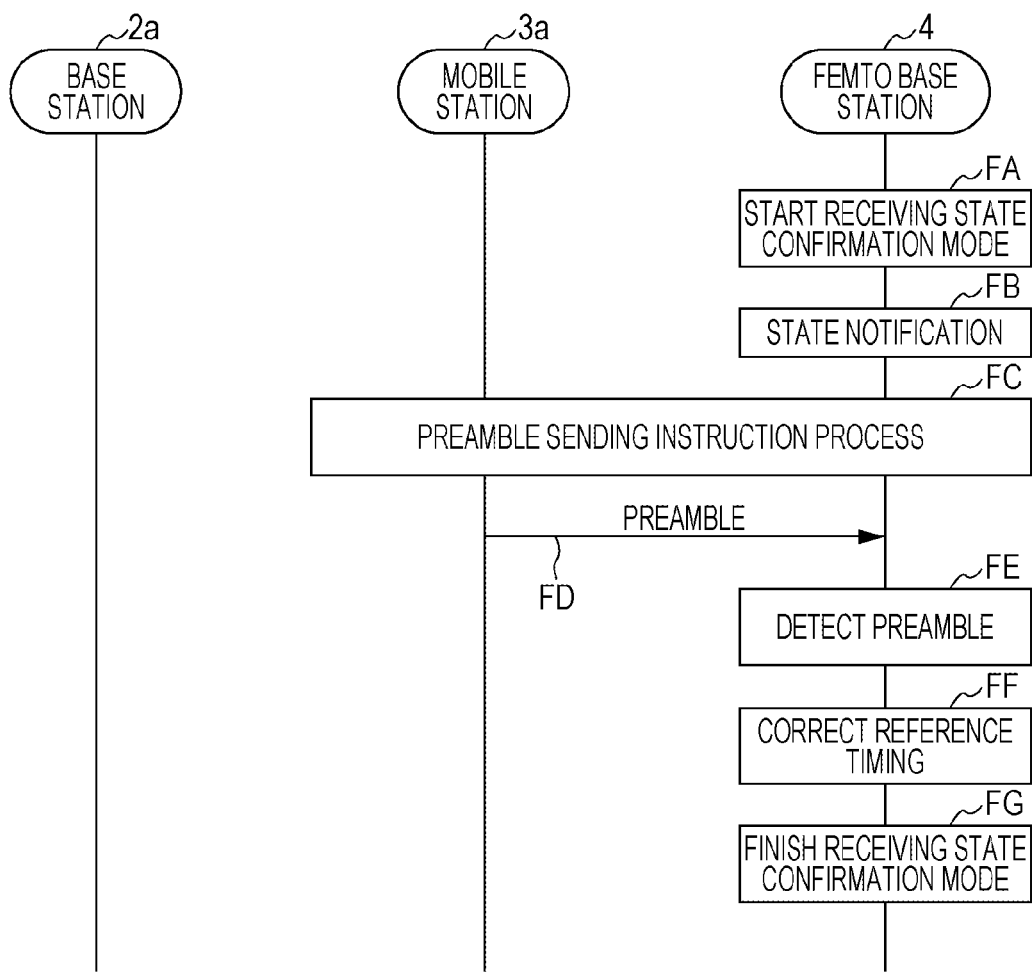
FIG. 13 is a diagram illustrating an example of an operational sequence of a femto base station, according to an embodiment.

FIG. 13 is a diagram illustrating an example of an operational sequence of a femto base station, according to an embodiment. In operation FA, the femto base station 4 starts operation in the receiving state confirmation mode and determines whether or not the timing difference Δ is stored in the storage unit 35. When the timing difference Δ is stored in the storage unit 35, the femto base station 4 determines whether or not a state of not receiving a preamble that is transmitted to another base station 2 is continued for a predetermined time period or more. The behaviors in operation FA are equivalent to the behaviors of the monitoring unit 40.

When the state of not receiving a preamble that is transmitted to another base station 2 is continued for a predetermined time period or more, in operation FB, the femto base station 4 notifies the user of the mobile station 3 that the preamble transmitted to another base station 2 is in a state of not being received. The behaviors in operation FB are equivalent to the behaviors of the monitoring unit 40 and the notification unit 41.

When the state of not receiving a preamble that is transmitted to another base station 2 is continued for a predetermined time period or more, in operation FC, the femto base station 4 carries out a preamble sending instruction process. The preamble sending instruction process in operation FC may be a process similar to the preamble sending instruction process described with reference to FIG. 12. The behaviors in operation FC are equivalent to the behaviors of the monitoring unit 40.

In operation FD, the mobile station 3a transmits a preamble for the base station 2a. In operation FE, the femto base station 4 detects the preamble transmitted from the mobile station 3a to the base station 2a. When a plurality of preambles arrive, the femto base station 4 may detect a preamble having received power closest to the received power that has been stored in the storage unit 35 in operation DL. The behaviors in operation FE are equivalent to the behaviors of the preamble detection unit 36.

In operation FF, the femto base station 4 corrects the reference timing based on the preamble detection timing in operation FE and the timing difference Δ. The behaviors in operation FF are equivalent to the behaviors of the second timing determination unit 37 and the timing correction unit 38. In operation FG, the femto base station 4 finishes the operation in the receiving state confirmation mode.

According to the embodiment, when receiving of preambles for another base station 2 is insufficient and there is a risk that the precision of the reference timing is not maintained, it becomes possible to cause the mobile station 3 to transmit a preamble for another base station 2 and perform correction of the reference timing. It is also possible to combine the fourth embodiment with the second embodiment, the third embodiment, and the fifth embodiment described later.

6. Fifth Embodiment

Descriptions are given to another embodiment of the first receiving unit 12. The femto base station 4 in the embodiment determines whether or not interference with another base station 2 occurs. When interference occurs, since there is a risk that the precision of the reference timing is not maintained, the femto base station 4 performs correction of the reference timing.

Figure 14:
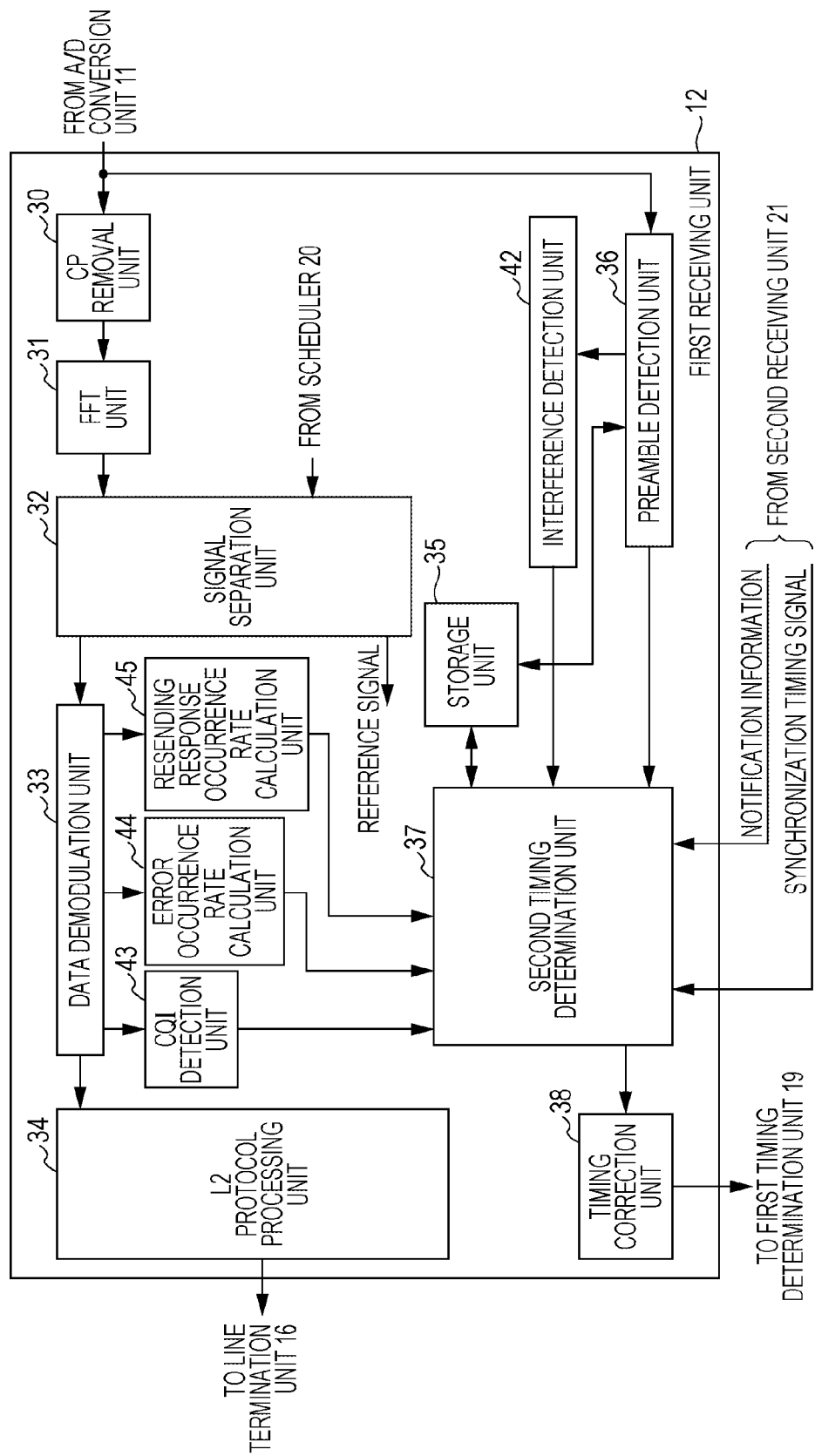
FIG. 14 is a diagram illustrating an example of a functional configuration of a first receiving unit, according to an embodiment.

FIG. 14 is a diagram illustrating an example of a functional configuration of a first receiving unit, according to an embodiment. The same reference numerals as the reference numerals used in FIG. 3 are given to components similar to the components illustrated in FIG. 3. The first receiving unit 12 is configured to include an interference detection unit 42, a channel quality indicator (CQI) detection unit 43, an error occurrence rate calculation unit 44, and a resending response occurrence rate calculation unit 45.

The interference detection unit 42 measures an amount of interference that uplink signal transmitted by a mobile station located in the area of the femtocell suffers from an uplink signal transmitted by a mobile station located in the area of another cell, based on the receiving strength of the preamble transmitted from the mobile station 3 to another base station 2. In the following descriptions, the amount of interference that the uplink signal transmitted by the mobile station located in the area of the femtocell suffers from an uplink signal transmitted by a mobile station located in the area of another cell may be expressed as "an amount IU of uplink interference".

When the amount IU of uplink interference is large, it is expected that the reference timing of the femto base station 4 is deviated from the state of being adjusted based on the synchronization timing signal and interference occurs in a downlink as well. The interference detection unit 42 notifies the second timing determination unit 37 of the amount of uplink interference.

The CQI detection unit 43 detects an average of CQI values reported from the mobile station located in the area of the femtocell. When the CQI is small, it is expected that interference occurs in the downlink. The CQI detection unit 43 notifies the second timing determination unit 37 of the average of CQI values.

The error occurrence rate calculation unit 44 receives an error determination result of an uplink signal from the data demodulation unit 33 and calculates an error occurrence rate RE. When the error occurrence rate of the uplink signal is large, it is expected that the reference timing of the femto base station 4 is deviated from the state of being adjusted based on the synchronization timing signal and interference occurs in the downlink as well. The error occurrence rate calculation unit 44 notifies the second timing determination unit 37 of the error occurrence rate RE.

The resending response occurrence rate calculation unit 45 detects a resending response responsive to downlink transmission to the mobile station located in the area of the femtocell. The resending response may be, for example, negative acknowledgement (NACK) or discontinuous transmission (DTX). The resending response occurrence rate calculation unit 45 calculates the resending response occurrence rate RR. When the resending response occurrence rate RR is large, it is expected that interference is occurring in the downlink. The resending response occurrence rate calculation unit 45 notifies the second timing determination unit 37 of the resending response occurrence rate RR.

The second timing determination unit 37 determines whether or not to carry out correction of the reference timing described above based on the detection timing of preamble destined for another base station 2, based on any or all of the amount IU of uplink interference, the average of CQI values, the error occurrence rate RE, and the resending response occurrence rate RR.

For example, the second timing determination unit 37 and the timing correction unit 38 may carry out correction of the reference timing when the amount IU of uplink interference is greater than a threshold TH1. The second timing determination unit 37 and the timing correction unit 38 may carry out correction of the reference timing when the average of CQI values is smaller than a threshold TH2.

The second timing determination unit 37 and the timing correction unit 38 may carry out correction of the reference timing when the error occurrence rate RE is greater than a threshold TH3. The second timing determination unit 37 and the timing correction unit 38 may carry out correction of the reference timing when the resending response occurrence rate RR is greater than a threshold TH4.

For example, the second timing determination unit 37 and the timing correction unit 38 may also carry out correction of the reference timing when the weighted sum of the amount IU of uplink interference, the average of CQI values, the error occurrence rate RE, and the resending response occurrence rate RR satisfies a predetermined condition.

Figure 15:
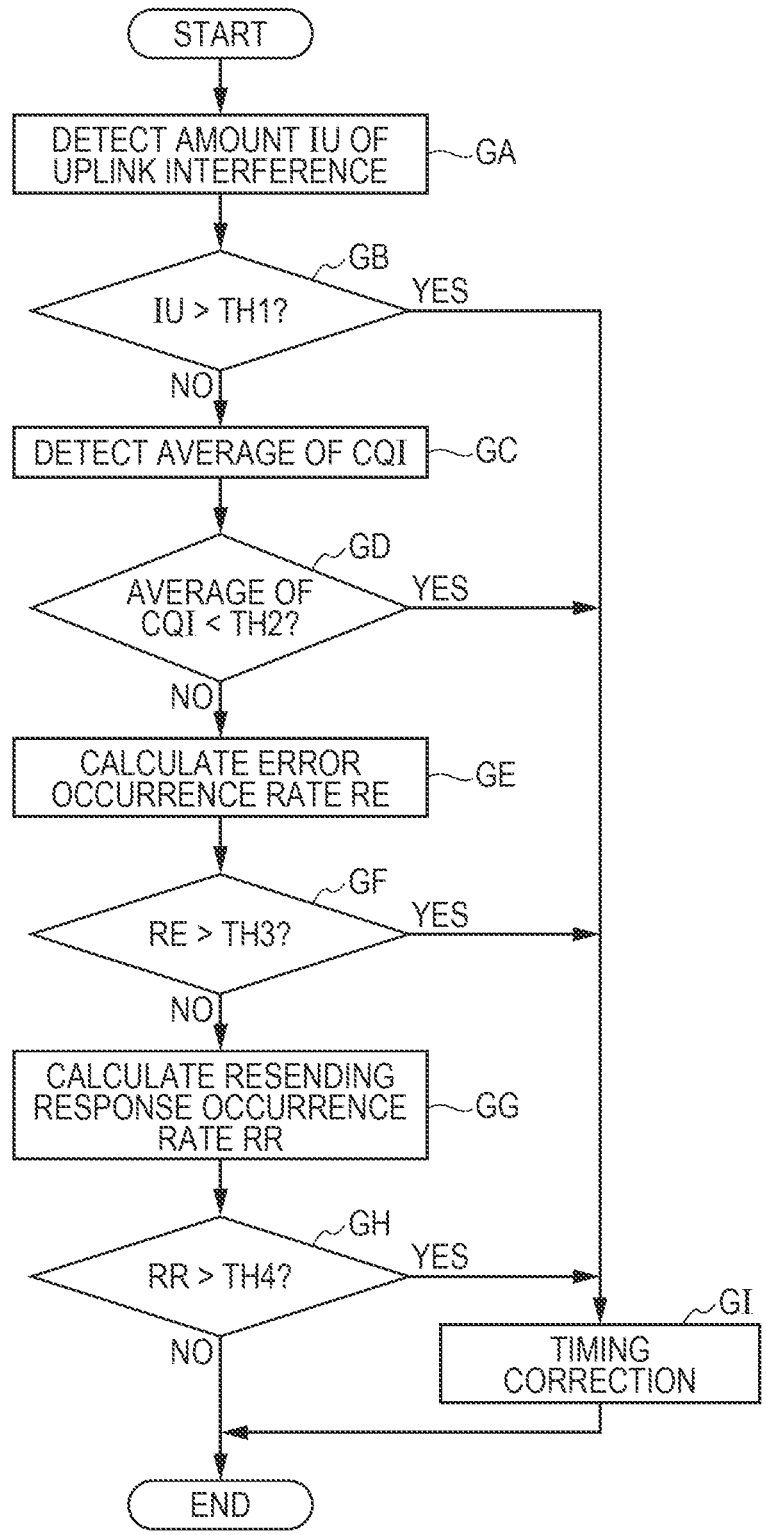
FIG. 15 is a diagram illustrating an example of an operational flowchart for a femto base station, according to an embodiment.

FIG. 15 is a diagram illustrating an example of an operational flowchart for a femto base station, according to an embodiment. In operation GA, the amount IU of uplink interference is detected. In operation GB, the second timing determination unit 37 determines whether or not the amount IU of uplink interference is greater than the threshold TH1. When the amount IU of uplink interference is greater than the threshold TH1 (YES in operation GB), the operation goes on to operation GI. When the amount IU of uplink interference is not greater than the threshold TH1 (NO in operation GB), the operation goes on to operation GC.

In operation GC, the CQI detection unit 43 detects the average of CQI values reported from the mobile station located in the area of the femtocell. In operation GD, the second timing determination unit 37 determines whether or not the average of CQI values is smaller than the threshold TH2. When the average of CQI values is smaller than the threshold TH2 (YES in operation GD), the operation goes on to operation GI. When the average of CQI values is not smaller than the threshold TH2 (NO in operation GD), the operation goes on to operation GE.

In operation GE, the error occurrence rate calculation unit 44 calculates the error occurrence rate RE. In operation GF, the second timing determination unit 37 determines whether or not the error occurrence rate RE is greater than the threshold TH3. When the error occurrence rate RE is greater than the threshold TH3 (YES in operation GF), the operation goes on to operation GI. When the error occurrence rate RE is not greater than the threshold TH3 (NO in operation GF), the operation goes on to operation GG.

In operation GG, the resending response occurrence rate calculation unit 45 calculates the resending response occurrence rate RR. In operation GH, the second timing determination unit 37 determines whether or not the resending response occurrence rate RR is greater than the threshold TH4. When the resending response occurrence rate RR is greater than the threshold TH4 (YES in operation GH), the operation goes on to operation GI.

In operation GI, the second timing determination unit 37 and the timing correction unit 38 carry out correction of the reference timing based on an average of detection timing of preambles for another base station 2 and the timing difference Δ. When the resending response occurrence rate RR is not greater than the threshold TH4 (NO in operation GH), the operation is finished without carrying out correction of the reference timing.

According to the embodiment, correction of the reference timing is carried out in accordance with the result of determination of whether or not interference occurs with another base station 2. Therefore, when interference occurs with another base station 2, it is possible to solve the interference quickly.

The second timing determination unit 37 and the timing correction unit 38 may also correct the reference timing periodically.

In addition, in operation GI, the second receiving unit 21 may also receive notification information by carrying out cell search. The second timing determination unit 37 and the timing correction unit 38 may also adjust the reference timing based on the synchronization timing signal generated by the cell search. The second timing determination unit 37 may also determine the timing difference Δ between the reference timing and the preamble detection timing of the base station 2 and stores the timing difference Δ in the storage unit 35. Such processes may also be executed periodically.

It is also possible to combine the second through fourth embodiments with the fifth embodiment.

7. Hardware Configuration

Figure 16:
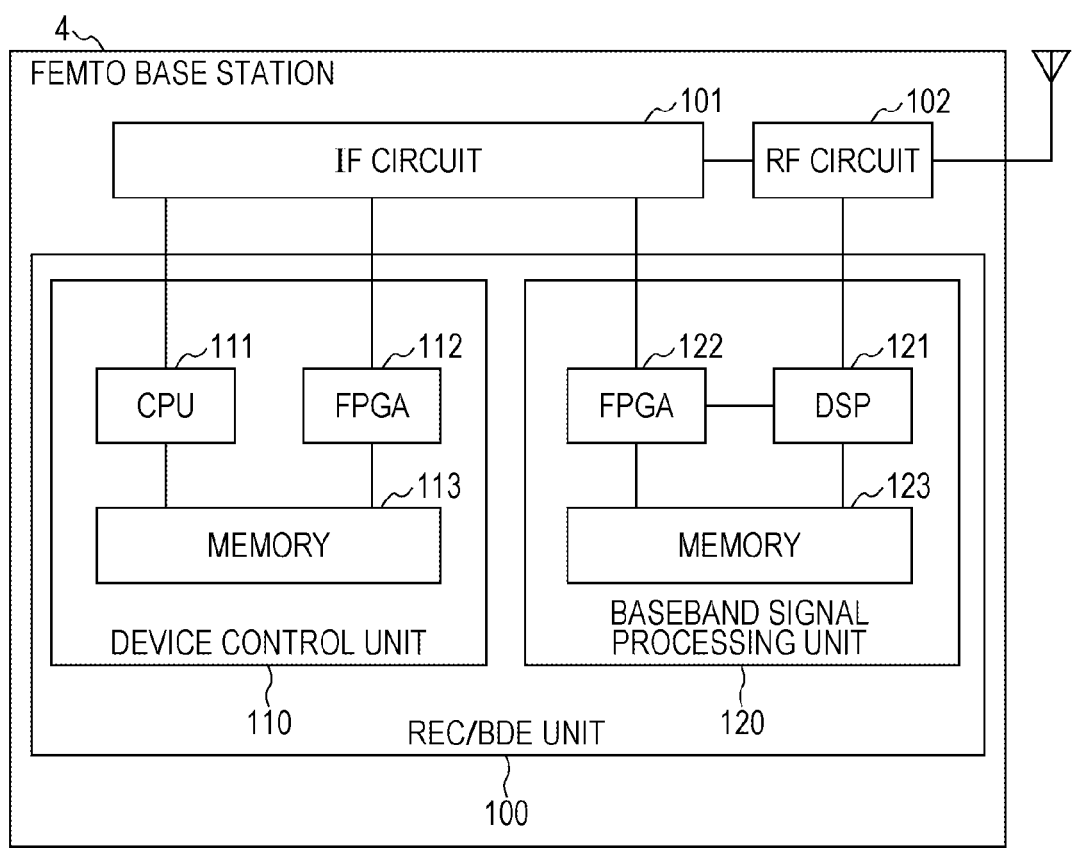
FIG. 16 is a diagram illustrating an example of a hardware configuration of a femto base station, according to an embodiment.

Next, descriptions are given to hardware configuration of the femto base station 4. FIG. 16 is a diagram illustrating an example of a hardware configuration of a femto base station, according to an embodiment. The femto base station 4 is configured to include a radio equipment control (REC)/base station digital processing equipment (BDE) unit 100, an interface circuit 101, and a wireless frequency circuit 102.

The REC/BED unit 100 includes a device control unit 110 and a baseband signal processing unit 120. The device control unit 110 carries out control of operations of the femto base station 4 and a communication process with a superior device. The device control unit 110 includes a central processing unit (CPU) 111, a field-programmable gate array (FPGA) 112, and a memory 113. In the memory 113, a computer program to be executed by the CPU 111 and configuration data to program the FPGA 112 are stored. These computer program and configuration data may also be installed in the memory 113 using a known setup program and the like from a computer readable portable recording medium.

The baseband signal processing unit 120 carries out a process of a baseband signal transmitted and received with the mobile station 3. The baseband signal processing unit 120 includes a digital signal processor (DSP) 121, an FPGA 122, and a memory 123. In the memory 123, a computer program to be executed by the DSP 121 and configuration data to program the FPGA 122 are stored. These computer program and configuration data may also be installed in the memory 123 using a known setup program and the like from a computer readable portable recording medium.

The above operations of the preamble detection unit 36, the second timing determination unit 37, the timing correction unit 38, the monitoring unit 40, the interference detection unit 42, the CQI detection unit 43, the error occurrence rate calculation unit 44, and the resending response occurrence rate calculation unit 45 may be executed by the DSP 121. A part and all of these operations may also be executed by the CPU 111 and the FPGA 112 and/or the FPGA 122. The above operations of the first timing determination unit 19 may be executed by the CPU 111. A part and all of these operations may also be executed by the DSP 121 and the FPGA 112 and/or the FPGA 122.

The hardware configuration illustrated in FIG. 16 is merely an exemplification for descriptions of the embodiments. The femto base station 4 described herein may also employ any other hardware configuration as long as the operations described above are executed.

In the descriptions above, the functional configuration diagrams in FIGS. 2, 3, 5, 7, 10, and 14 mainly illustrate the configuration related to the functions described herein. The femto base station 4 may include components other than the illustrated components. The series of operations described with reference to FIGS. 6, 8, 9, 11 through 13, and 15 may also be understood as a method including a plurality of procedures. In this case, the "operation" may also be replaced by a "step".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus in a communication system including first and second base stations, the apparatus operating as the first base station, the apparatus comprising:
   a timer;
   a timing determination unit configured to determine a first reference timing that is used as a reference timing for transmitting a downlink signal, based on a timing measured by the timer;
   a timing adjustment unit configured to adjust the first reference timing determined by the timing determination unit, to a second reference timing being used in the second base station; and
   a timing correction unit configured to correct a deviation of the first reference timing from the second reference timing, which has occurred after adjustment of the first reference timing by the timing adjustment unit, in accordance with a receiving timing of a preamble signal transmitted from a mobile station device to the second base station, wherein said timing correction unit is further configured to correct the deviation of the first reference timing in accordance with an average of receiving timings of preamble signals that have been transmitted from a plurality of mobile station devices to the second base station.

2. The apparatus of claim 1, wherein
the timing correction unit includes a timing difference determination unit configured to determine a timing difference between the first reference timing adjusted by the timing adjustment unit and a first receiving timing of a first preamble signal that has been transmitted from the mobile station device to the second base station; and
the timing correction unit corrects the deviation of the first reference timing, based on the determined timing difference and a second receiving timing of a second preamble signal that has been transmitted from the mobile station device to the second base station after determination of the timing difference.

3. The apparatus of claim 1, wherein the timing correction unit corrects the deviation of the first reference timing, in accordance with a first receiving timing of a first preamble signal having greatest receiving strength among preamble signals that have been transmitted from a plurality of mobile station devices to the second base station.

4. The apparatus of claim 1, wherein the timing correction unit corrects the deviation of the first reference timing, in accordance with an average of receiving timings of preamble signals that are selected, in an order of greater received power, from among preamble signals that have been transmitted from the plurality of mobile station devices to the second base station.

5. The apparatus of claim 1, further comprising a sending unit configured to transmit a preamble sending instruction signal for causing the mobile station device to transmit the preamble signal to the second base station.

6. The apparatus of claim 5, wherein the sending unit transmits the preamble sending instruction signal in accordance with a state of receiving the preamble signal transmitted from the mobile station device to the second base station.

7. The apparatus of claim 1, further comprising a notification unit configured to notify a state of receiving the preamble signal transmitted from the mobile station device to the second base station.

8. The apparatus of claim 1, wherein the timing correction unit determines whether to correct the deviation of the first reference timing, in accordance with an interference state of the first and second base stations.

9. The apparatus of claim 1, wherein the timing adjustment unit adjusts the first reference timing, based on a receiving timing of a synchronization signal transmitted from the second base station.

10. The apparatus of claim 9, wherein the timing adjustment unit adjusts the first reference timing so that a timing at which the apparatus transmits beginning of a wireless frame is synchronized with a receiving timing of beginning of a wireless frame transmitted from the second base station.

11. The apparatus of claim 1, wherein the timing adjustment unit adjusts the first reference timing by exchanging a packet in which clock time information is stored with the second base station in accordance with a predetermined clock time synchronization protocol.

12. A method for adjusting a reference timing used for transmitting a downlink signal in a communication system including first and second base stations, the method comprising:
determining a first reference timing that is used as a reference timing for transmitting a downlink signal;
adjusting the determined first reference timing to a second reference timing being used in the second base station; and
correcting a deviation of the first reference timing from the second reference timing, which has occurred after adjustment of the first reference timing, in accordance with a receiving timing of a preamble signal transmitted from a mobile station device to the second base station, said correcting further comprising correcting the deviation of the first reference timing, in accordance with an average of receiving timings of preamble signals that have been transmitted from a plurality of mobile station devices to the second base station.

13. A computer readable, non-transitory recording medium having stored therein a program for causing a programmable device in a communication system including first and second base stations to execute a process, the programmable device operating in the first base station, the process comprising:
determining a first reference timing that is used as a reference timing for transmitting a downlink signal;
adjusting the determined first reference timing to a second reference timing being used in the second base station; and
correcting a deviation of the first reference timing from the second reference timing, which has occurred after adjustment of the first reference timing, in accordance with a receiving timing of a preamble signal transmitted from a mobile station device to the second base station, said correcting further comprising correcting the deviation of the first reference timing, in accordance with an average of receiving timings of preamble signals that have been transmitted from a plurality of mobile station devices to the second base station.

* * * * *